United States Patent
Zbinden et al.

(10) Patent No.: US 11,372,178 B2
(45) Date of Patent: Jun. 28, 2022

(54) RACK-MOUNTABLE EQUIPMENT WITH A HIGH-HEAT-DISSIPATION MODULE, AND TRANSCEIVER RECEPTACLE WITH INCREASED COOLING

(71) Applicant: Samtec, Inc., New Albany, IN (US)

(72) Inventors: Eric J. Zbinden, New Albany, IN (US); Thomas A. Hall, III, New Albany, IN (US)

(73) Assignee: SAMTEC, INC., New Albany, IN (US)

(*) Notice: Subject to any disclaimer, the term of this patent is extended or adjusted under 35 U.S.C. 154(b) by 0 days.

(21) Appl. No.: 16/687,891

(22) Filed: Nov. 19, 2019

(65) Prior Publication Data

US 2020/0081206 A1    Mar. 12, 2020

Related U.S. Application Data

(63) Continuation of application No. 16/135,254, filed on Sep. 19, 2018, now Pat. No. 10,534,145, which is a continuation of application No. 15/261,295, filed on Sep. 9, 2016, now Pat. No. 10,114,182.

(60) Provisional application No. 62/350,368, filed on Jun. 15, 2016, provisional application No. 62/341,650, filed on May 26, 2016, provisional application No. 62/216,609, filed on Sep. 10, 2015.

(51) Int. Cl.
  *G02B 6/42* (2006.01)
  *G02B 6/38* (2006.01)

(52) U.S. Cl.
  CPC .......... *G02B 6/4268* (2013.01); *G02B 6/3897* (2013.01); *G02B 6/4249* (2013.01)

(58) Field of Classification Search
  CPC ... G02B 6/4268; G02B 6/3897; G02B 6/4249

USPC ........................................................ 439/487
See application file for complete search history.

(56) References Cited

U.S. PATENT DOCUMENTS 3,717,720 A * 2/1973 Snellman ............... H01B 5/105
                                                          57/232
4,623,218 A * 11/1986 Laurette ............... G02B 6/4407
                                                          385/103
(Continued)

FOREIGN PATENT DOCUMENTS

CN       1179223 C     12/2004
CN     101488610 A      7/2009
(Continued)

OTHER PUBLICATIONS

Official Communication issued in corresponding Chinese Patent Application No. 201910971907.5, dated Dec. 1, 2020.
(Continued)

*Primary Examiner* — Alexander Gilman
(74) *Attorney, Agent, or Firm* — Keating & Bennett, LLP

(57) ABSTRACT

An electrical connector includes a heat dissipation module with a first end and a second end opposed to the first end and two receptacle connectors located at the second end. The first and second ends define a transceiver-mating direction such that, when a transceiver is inserted into the first end of the heat dissipation module in the transceiver-mating direction, the transceiver mates with one of the two receptacle connectors, and in the heat dissipation module, air flows parallel to the transceiver-mating direction between the first and second ends and flows between the two receptacle connectors.

22 Claims, 32 Drawing Sheets

(56) References Cited

U.S. PATENT DOCUMENTS

| | | | | |
|---|---|---|---|---|
| 5,201,663 A * | 4/1993 | Kikuchi | H01R 13/6315 | 439/82 |
| 5,306,168 A * | 4/1994 | Kunishi | H01R 13/6315 | 439/248 |
| 5,397,241 A | 3/1995 | Cox et al. | | |
| 5,915,979 A * | 6/1999 | Schell | H01R 12/83 | 439/83 |
| 6,098,127 A * | 8/2000 | Kwang | H01R 31/005 | 439/502 |
| 6,162,089 A | 12/2000 | Costello et al. | | |
| 6,171,152 B1 * | 1/2001 | Kunz | H01R 24/64 | 439/676 |
| 6,406,192 B1 * | 6/2002 | Chen | H01R 13/6315 | 439/248 |
| 6,558,191 B2 * | 5/2003 | Bright | G02B 6/4246 | 439/541.5 |
| 6,600,865 B2 * | 7/2003 | Hwang | H01R 13/659 | 439/541.5 |
| 6,796,831 B1 * | 9/2004 | Yasufuku | H04K 7/1431 | 439/325 |
| 6,816,376 B2 | 11/2004 | Bright et al. | | |
| 6,926,551 B1 * | 8/2005 | Schulz | H01R 13/6272 | 439/357 |
| 6,932,514 B2 * | 8/2005 | Anderson | G02B 6/3825 | 385/59 |
| 6,972,968 B2 * | 12/2005 | Hwang | H05K 9/0058 | 174/383 |
| 6,986,679 B1 * | 1/2006 | Aronson | H01R 13/6594 | 439/541.5 |
| 7,137,847 B2 | 11/2006 | Trout et al. | | |
| 7,371,965 B2 * | 5/2008 | Ice | G02B 6/4269 | 174/548 |
| 7,442,055 B2 * | 10/2008 | Robinette | H01R 12/585 | 439/541.5 |
| 7,457,126 B2 | 11/2008 | Ahrens | | |
| 7,494,287 B2 * | 2/2009 | Wang | G02B 6/4201 | 385/88 |
| 7,553,188 B2 | 6/2009 | Whiteman, Jr. et al. | | |
| 7,566,244 B1 * | 7/2009 | Nguyen | G02B 6/4284 | 439/352 |
| 7,594,766 B1 | 9/2009 | Sasser et al. | | |
| 7,764,504 B2 * | 7/2010 | Phillips | H01R 13/6582 | 174/15.2 |
| 7,828,569 B2 * | 11/2010 | Aronson | H01R 24/64 | 439/218 |
| 7,896,659 B1 * | 3/2011 | Westman | H01R 13/6595 | 439/607.25 |
| 7,963,799 B1 * | 6/2011 | Lee | H01R 13/518 | 439/701 |
| 8,105,110 B2 | 1/2012 | Hsia et al. | | |
| 8,182,290 B2 * | 5/2012 | Fonteneau | H05K 9/0058 | 439/607.4 |
| 8,287,306 B2 * | 10/2012 | Daugherty | H01R 13/518 | 439/540.1 |
| 8,467,190 B2 * | 6/2013 | Yi | G02B 6/4269 | 439/607.2 |
| 8,613,632 B1 * | 12/2013 | Nichols | H01R 13/6587 | 439/485 |
| 8,823,540 B2 * | 9/2014 | Scholeno | H04B 10/801 | 340/815.4 |
| 8,830,679 B2 * | 9/2014 | Scholeno | H05K 7/2049 | 174/16.3 |
| 8,870,595 B2 * | 10/2014 | Schmitt | H01R 13/6587 | 439/607.25 |
| 8,879,267 B2 | 11/2014 | Henry et al. | | |
| 8,885,342 B2 | 11/2014 | Skepnek et al. | | |
| 8,923,674 B1 * | 12/2014 | Sakabe | G02B 6/4402 | 385/100 |
| 8,944,830 B2 * | 2/2015 | Little | H01R 12/724 | 439/79 |
| 8,974,125 B2 * | 3/2015 | McColloch | H04B 10/40 | 361/676 |
| 9,011,177 B2 | 4/2015 | Llyod et al. | | |
| 9,052,473 B2 * | 6/2015 | Schmelz | G02B 6/4278 | |
| 9,075,205 B2 * | 7/2015 | Pepe | G02B 6/3895 | |
| 9,077,125 B2 * | 7/2015 | Hogan | H01R 12/724 | |
| 9,089,068 B2 * | 7/2015 | Sechrist | H05K 7/1447 | |
| 9,124,025 B2 * | 9/2015 | Xue | G02B 6/4261 | |
| 9,142,922 B2 * | 9/2015 | Regnier | H01R 13/6586 | |
| 9,246,280 B2 | 1/2016 | Neer et al. | | |
| 9,291,782 B2 * | 3/2016 | Skepnek | G02B 6/4201 | |
| 9,323,016 B2 * | 4/2016 | Su | G02B 6/4246 | |
| 9,325,100 B2 | 4/2016 | Hirschy | | |
| 9,402,332 B2 * | 7/2016 | McKervey | H05K 9/0041 | |
| 9,484,678 B1 * | 11/2016 | Briant | H01R 13/659 | |
| 9,518,785 B2 * | 12/2016 | Szczesny | G02B 6/4269 | |
| 9,531,117 B1 * | 12/2016 | Yang | H01R 13/506 | |
| 9,583,886 B2 * | 2/2017 | Phillips | H01R 13/516 | |
| 9,620,906 B1 * | 4/2017 | Briant | H01R 13/6581 | |
| 9,653,829 B2 * | 5/2017 | Long | H01R 13/46 | |
| 9,668,378 B2 * | 5/2017 | Phillips | H05K 7/20418 | |
| 9,673,570 B2 * | 6/2017 | Briant | G02B 6/4269 | |
| 9,696,506 B2 * | 7/2017 | Wu | H05K 7/204069 | |
| 9,761,974 B2 * | 9/2017 | L'Esperance | H01R 12/721 | |
| 9,774,143 B1 * | 9/2017 | Su | H01R 13/6462 | |
| 9,793,648 B2 * | 10/2017 | Regnier | H05K 7/20509 | |
| 9,800,340 B2 * | 10/2017 | Berlin | H04B 10/25753 | |
| 9,869,832 B2 * | 1/2018 | Jokura | G02B 6/4278 | |
| 9,877,413 B2 * | 1/2018 | Regnier | G02B 6/4284 | |
| 9,882,297 B2 * | 1/2018 | Regnier | H01R 43/205 | |
| 9,912,097 B2 * | 3/2018 | Lee | H01R 13/6273 | |
| 9,923,321 B2 * | 3/2018 | Wang | H01R 24/60 | |
| 9,955,570 B2 * | 4/2018 | Blum | H05K 1/0216 | |
| 10,061,090 B2 * | 8/2018 | Coenegracht | G02B 6/3817 | |
| 10,091,911 B2 * | 10/2018 | Kelty | G02B 6/4269 | |
| 10,114,182 B2 * | 10/2018 | Zbinden | G02B 6/4268 | |
| 10,135,211 B2 | 11/2018 | Lloyd et al. | | |
| 10,153,571 B2 * | 12/2018 | Kachlic | H01R 12/712 | |
| 10,375,859 B2 * | 8/2019 | Wanha | G06F 1/20 | |
| 10,386,589 B2 * | 8/2019 | Smith | H01R 13/405 | |
| 10,476,198 B1 * | 11/2019 | Pogash | H01R 13/518 | |
| 10,581,210 B2 * | 3/2020 | Pogash | H01R 13/741 | |
| 10,651,607 B1 * | 5/2020 | Gawlowski | H01R 13/659 | |
| 10,739,828 B2 | 8/2020 | Reed et al. | | |
| 10,873,161 B2 * | 12/2020 | Henry | H01R 12/716 | |
| 10,921,536 B2 * | 2/2021 | Park | G02B 6/4284 | |
| 10,950,997 B2 * | 3/2021 | Dambach | H01R 13/6275 | |
| 10,965,333 B2 * | 3/2021 | English | H04B 1/036 | |
| 2003/0161108 A1 * | 8/2003 | Bright | H05K 9/0058 | 361/707 |
| 2006/0088251 A1 * | 4/2006 | Wang | G02B 6/4201 | 385/101 |
| 2007/0133930 A1 * | 6/2007 | Ishikawa | G02B 6/4283 | 385/92 |
| 2009/0109627 A1 | 4/2009 | Murr et al. | | |
| 2009/0220227 A1 * | 9/2009 | Wong | G02B 6/4284 | 398/41 |
| 2010/0029117 A1 | 2/2010 | Underwood et al. | | |
| 2011/0028030 A1 * | 2/2011 | Chang | H01R 13/514 | 439/492 |
| 2012/0058670 A1 * | 3/2012 | Regnier | H01R 12/00 | 439/485 |
| 2012/0099275 A1 * | 4/2012 | Regnier | H05K 7/20145 | 361/690 |
| 2012/0164878 A1 | 6/2012 | Yi et al. | | |
| 2012/0182688 A1 * | 7/2012 | McColloch | H04B 10/40 | 361/692 |
| 2012/0257355 A1 * | 10/2012 | Yi | G02B 6/4269 | 361/704 |
| 2012/0264330 A1 * | 10/2012 | Banakis | H01R 13/6585 | 439/569 |
| 2013/0017715 A1 * | 1/2013 | Laarhoven | H01R 13/717 | 439/490 |
| 2013/0114211 A1 * | 5/2013 | Regnier | G02B 6/4201 | 361/704 |
| 2014/0016902 A1 | 1/2014 | Pepe et al. | | |
| 2014/0030922 A1 * | 1/2014 | Schmitt | H01R 13/6587 | 439/607.2 |
| 2014/0056592 A1 * | 2/2014 | McColloch | H04B 10/40 | 29/428 |

(56) References Cited

U.S. PATENT DOCUMENTS

| | | | | |
|---|---|---|---|---|
| 2014/0080352 | A1* | 3/2014 | Xue | H01R 13/533 439/487 |
| 2014/0106582 | A1* | 4/2014 | Wig | H04B 1/3883 439/78 |
| 2014/0205257 | A1 | 7/2014 | Durrant et al. | |
| 2014/0335726 | A1* | 11/2014 | Zhang | H01R 13/743 439/607.01 |
| 2014/0349519 | A1* | 11/2014 | Gao | H01R 13/648 439/607.01 |
| 2014/0357106 | A1* | 12/2014 | Varshavsky | H01R 43/26 439/152 |
| 2014/0360752 | A1* | 12/2014 | Sechrist | H05K 7/1491 174/79 |
| 2015/0029667 | A1* | 1/2015 | Szczesny | G02B 6/4261 361/700 |
| 2015/0087180 | A1 | 3/2015 | Wu et al. | |
| 2016/0105991 | A1* | 4/2016 | Wanha | H01L 23/467 165/185 |
| 2016/0197424 | A1* | 7/2016 | L'Esperance | G02B 6/4268 439/61 |
| 2016/0218455 | A1* | 7/2016 | Sayre | H01R 13/6594 |
| 2017/0077643 | A1* | 3/2017 | Zbinden | G02B 6/4268 |
| 2017/0207549 | A1* | 7/2017 | Chang | H01R 24/60 |
| 2017/0285282 | A1* | 10/2017 | Regnier | G02B 6/3885 |
| 2018/0248305 | A1* | 8/2018 | Regnier | H05K 7/20509 |
| 2018/0278000 | A1* | 9/2018 | Regnier | H01R 12/721 |
| 2018/0287280 | A1* | 10/2018 | Ratkovic | H01R 12/62 |
| 2018/0366880 | A1* | 12/2018 | Zerebilov | H01R 13/6586 |
| 2019/0089106 | A1* | 3/2019 | Regnier | H01R 12/721 |
| 2020/0244025 | A1* | 7/2020 | Winey | H01R 43/26 |
| 2020/0274267 | A1* | 8/2020 | Zerebilov | G02B 6/4246 |
| 2020/0274301 | A1* | 8/2020 | Manter | B23K 1/0016 |

FOREIGN PATENT DOCUMENTS

| | | |
|---|---|---|
| CN | 202076607 U | 12/2011 |
| CN | 102365907 A | 2/2012 |
| CN | 102544882 A | 7/2012 |
| CN | 102570152 A | 7/2012 |
| CN | 102882029 A | 1/2013 |
| CN | 202949071 U | 5/2013 |
| CN | 203279430 U | 11/2013 |
| CN | 104209925 A | 12/2014 |
| CN | 104244655 A | 12/2014 |
| CN | 203983581 U | 12/2014 |
| CN | 104470321 A | 3/2015 |
| CN | 204229979 U | 3/2015 |
| CN | 104508525 A | 4/2015 |
| CN | 104603656 A | 5/2015 |
| CN | 104756621 A | 7/2015 |
| CN | 104779548 A | 7/2015 |
| TW | 201234788 A | 8/2012 |
| WO | 2010/088603 A1 | 8/2010 |

OTHER PUBLICATIONS

Official Communication issued in corresponding Chinese Patent Application No. 201910971826.5, dated Nov. 2, 2020.
Guetig et al., "Transceiver Assembly Array With Fixed Heatsink and Floating Transceivers", U.S. Appl. No. 16/619,246, filed Dec. 4, 2019.
Official Communication issued in corresponding Chinese Patent Application No. 201910972331.4, dated Dec. 31, 2020.
Fjelstad, "Flexible Circuit Technology, Third Edition", BR Publishing, Inc., Sep. 2006, 226 pages.
Agilent Technologies, Inc., "Agilent Designing Scalable 10G Backplane Interconnect Systems Utilizing Advanced Verification Methodologies—White Paper", May 5, 2012, pp. 1-24.
Official Communication issued in corresponding Chinese Patent Application No. 201910972158.8, dated Nov. 2, 2020.
Official Communication issued in corresponding Chinese Patent Application No. 201910972282.4, dated Oct. 28, 2020.
Zbinden et al., "Rack-Mountable Equipment With a High-Heat-Dissipation Module, and Transceiver Receptacle With Increased Cooling", U.S. Appl. No. 16/135,254, filed Sep. 19, 2018.
Official Communication issued in corresponding Chinese Patent Application No. 201910972149.9, dated Sep. 27, 2020.
Official Communication issued in corresponding Chinese Patent Application No. 201910971918.3, dated Oct. 13, 2020.
Official Communication issued in corresponding Chinese Patent Application No. 201910972282.4, dated Jun. 2, 2021.
Official Communication issued in corresponding Chinese Patent Application No. 201910971907.5, dated Jun. 2, 2021.
Official Communication issued in corresponding Chinese Patent Application No. 201910971826.5, dated Jun. 22, 2021.
Official Communication issued in corresponding Chinese Patent Application No. 201910972158.8, dated Jun. 28, 2021.
Official Communication issued in corresponding Chinese Patent Application No. 201910972282.4, dated Nov. 12, 2021.
Official Communication issued in corresponding Chinese Patent Application No. 201910971826.5, dated Feb. 1, 2022.

* cited by examiner

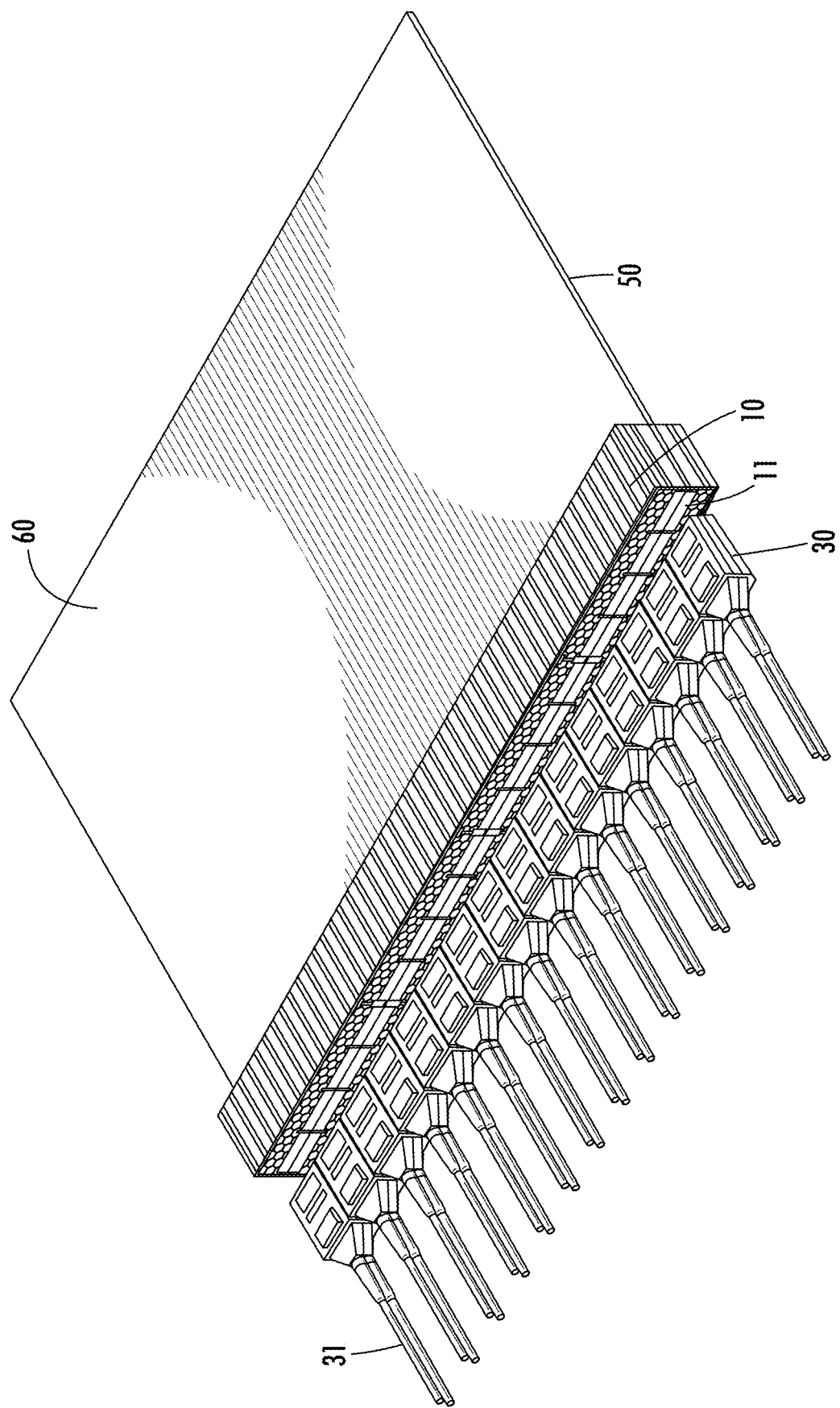

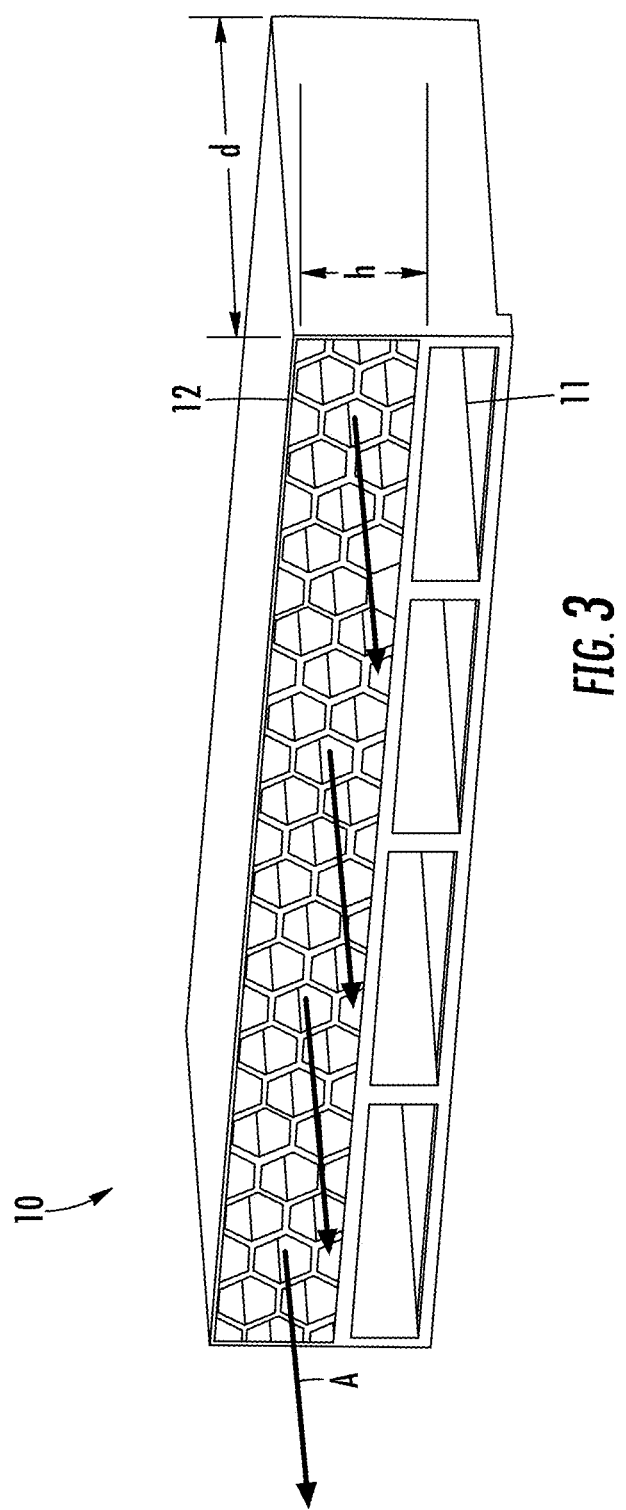

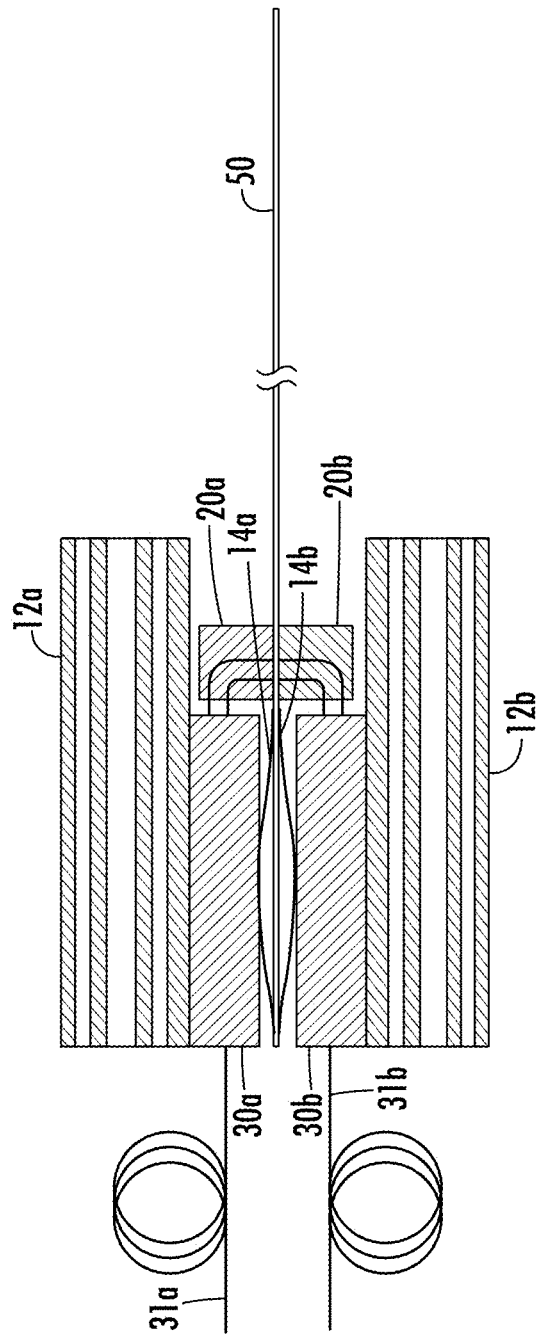

RACK-MOUNTABLE EQUIPMENT WITH A HIGH-HEAT-DISSIPATION MODULE, AND TRANSCEIVER RECEPTACLE WITH INCREASED COOLING

BACKGROUND OF THE INVENTION

1. Field of the Invention

The present invention relates to rack-mountable equipment with a heat-dissipation module and data interconnects, and also relates to a receptacle that receives an optical transceiver and that has increased cooling.

2. Description of the Related Art

Electronics racks are standard components for mounting a wide variety of electronic components and equipment in data, computing, and/or communication systems. Data centers typically have large numbers of racks, each filled with various pieces of electronic equipment, such as servers. A standard electrical rack has a 19" width, which can support assemblies that mount into the rack with a width of 17.25". Multiple assemblies can be mounted in each rack, one above the other. These assemblies typically are supported by a front bezel formed from cut outs in a flat piece of sheet metal that has clearance holes or slots along its edges to secure the bezel to the rack.

The rack-mountable electronic components often generate heat that needs to be removed from the rack to avoid overheating of the various electronic components. Typically cooling is provided by a fan that forces air across a heat sink that is in thermal contact with the temperature-sensitive, heat-producing electronic components.

The rapid increase in data storage and high-bandwidth communication driven by Internet expansion is increasing the need for dense interconnection systems in data centers. These data centers are typically composed of rows of racks of servers. These servers need to be in high-bandwidth communication with other servers in the data centers. The high-bandwidth communication can be supported by either shielded electrical cables or increasingly active optical cables. Active optical cables support longer transmission distances and higher transmission bandwidths. An active optical cable typically has an optical engine incorporated into a transceiver on at least one end of the cable that transforms electrical signals into optical signals (transmission (Tx) function) and transforms optical signals into electrical signals (receiver (Rx) function). An electronics rack can have hundreds or even thousands of interconnections, each of which generates heat that must be removed from the electronics rack. The inability to remove this heat can result in accelerated aging and/or premature failure of the interconnection or other components in the electronics rack. There is a need to provide a rack mounting system that facilitates high-heat removal and dense packaging of the interconnections.

FIG. 21 shows a known active optical cable 200 including a cable 201 and a transceiver 203. The transceiver 201 shown in FIG. 21 is compatible with SFF-8436 QSFP+ multi-source agreement revision 4.8, Oct. 31, 2013, hereby incorporated by reference in its entirety. Other known types of transceivers include SFP, QSFP, microQSFP, etc. The transceiver 203 can mate and unmate with receptacles in a rack (the receptacles and the rack are not shown in FIG. 21). The receptacles can be mounted to a printed circuit board (PCB). Mating the transceiver 203 to the receptacle creates mechanical and electrical connections. Electrical signals can be transported between the receptacle and the PCB. The transceiver 203 includes a pull tab 202 and an edge card 204. The pull tab 202 is optional and can be used to unmate the transceiver 203. The edge card 204 can mate with a connector within the receptacle. The edge card 204 can transport electrical signals to/from the transceiver 203.

The transceiver 203 can be optical, electrical, or hybrid of optical and electrical. If the transceiver 203 is optical, then the cable 201 includes optical fibers that transport, in which transport means receive and/or transmit, optical signals. The optical fibers can be single-mode or multimode fibers. The transceiver 201 can include an optical engine for transforming optical signals to electrical signals and/or electrical signals into optical signals.

If the transceiver 203 is electrical, then the cable 201 includes electrically conductive wires that transport electrical signals. The cable 201 can be, for example, coaxial cable, which is sometimes referred to as coax and which includes a single conductor surrounded by a dielectric and a shield layer, and twinaxial cable, which is sometimes referred to as twinax and which includes two conductors surrounded by a dielectric and shield layer. The cable 201 can also include other suitable transmission lines. The transceiver 201 can include contain electronic circuitry that transport electrical signals, including, for example, high-bandwidth electrical signals.

If the transceiver is a hybrid, then the cable 201 includes both optical and electrical cables. The transceiver 203 includes both an optical engine that transforms optical signals into electrical signals and/or electrical signals into optical signals and electronic circuitry that are appropriate for transmitting and/or receiving electrical signals from the electrical cable.

There is an increasing need for smaller transceivers that can be more tightly packed together and higher bandwidth transceivers. However, as channel density and bandwidth increased, the heat generated by the transceiver increases, which can cause excessive temperatures in the transceiver. Excessive temperatures can lead to premature failure and poor performance. Thus, there is a need for a transceiver receptacle that provides improved cooling for densely packaged, high-bandwidth transceivers.

FIGS. 22-24 show a known receptacle 205 that can be used with an electronics rack. The receptacle 205 can be mounted to a rack mount, which can then be mounted to an electronics rack. The receptacle 205 includes a cage 216 with mounting pins 217 and receptacle connectors 220 within the cage connected to wafers 222. Each wafer 222 is a module that includes a molded insert and a lead frame. The lead frame includes electrical contacts that each provide an electrical path for transmitting electrical signals. The molded insert is molded around the lead frame so that the electrical contacts are fixed with respect to each other within the wafer 222. The wafers 222 can be inserted into the receptacle connector 220 such that the wafers 222 are arranged side-by-side to each other so that the electrical contacts of adjacent wafers 222 are fixed with respect to each other in the receptacle connector 220. The cage 216 includes electromagnetic shields 218, faceplate 219, and slots 211. Transceivers can be inserted into the slots 211 to engage with the receptacle connectors 220. The receptacle connectors 220 are connected to wafers 222 that block or impede air flow.

During operation, the electronic components of the transceivers generate heat, which is mostly dissipated through the upper and lower walls, with a small amount being dissipated through the side walls. The heat dissipated into the passage 207 cannot be adequately removed because the wafers 222 block the flow of air in a direction from faceplate 219 to receptacle connector 220. As shown in FIG. 23, it is known to use holes in the sides of the cage 216. The location and size of the holes restrict the amount of air that is available to move through the cage 216 for cooling, particularly when a transceiver is inserted into the cage 216. But these side holes do not effectively remove the heat within the passage 207 (FIG. 22) and thus do not effectively remove heat from the transceivers. For interior transceivers in arrays 3×2 and bigger, the holes in the sides are not effective or adequate because the heat has to flow from an interior passage to an exterior passage with the sides holes. If the heat in the passage 207 cannot be adequately removed, the transceivers can undergo accelerated aging and/or prematurely fail. Thus, there is need for a receptacle with improved heat management.

SUMMARY OF THE INVENTION

To overcome the problems described above, preferred embodiments of the present invention provide an air-cooled heat sink that is located in the front bezel of a rack. Robust physical contact is provided between the heat sink and the heat generating components of the interconnection system, including, for example, the transceiver of an active optical cable. The robust physical contact and large heat dissipating surface of the heat sink provide a low impedance thermal path between the transceiver and the ambient environment. In addition to providing heat dissipation, the heat sink can also serve as an electromagnetic radiation shield, reducing radiated stray electromagnetic radiation outside of the rack enclosure.

To overcome the problems described above, preferred embodiments of the present invention provide a receptacle with a cage that can be mounted to a PCB and with a receptacle connector in the cage. Electrical connections between the PCB and the receptacle are made by flyover cables. A transceiver can be mated and unmated to the receptacle.

An electrical connector according to a preferred embodiment of the present invention includes a heat dissipation module with a first end and a second end opposed to the first end and two receptacle connectors located at the second end. The first and second ends define a transceiver-mating direction such that, when a transceiver is inserted into the first end of the heat dissipation module in the transceiver-mating direction, the transceiver mates with one of the two receptacle connectors, and in the heat dissipation module, air flows parallel to the transceiver-mating direction between the first and second ends and flows between the two receptacle connectors.

The two receptacle connectors are preferably vertically stacked in relation to a base substrate. The two receptacle connectors preferably each receive a card-edge of a mating transceiver. Preferably, the heat dissipation module includes a cage, and the cage further defines two slots that extend between the first and second ends, and the air flows between the slots. The two receptacle connectors are preferably electrically isolated from one another.

Preferably, the two receptacle connectors each include a housing, high-speed and low-speed electrical contacts in the housing, high-speed cables electrically connected to the high-speed electrical contacts, and low-speed cables and a power filter electrically attached to the low-speed electrical contacts.

The electrical connector further preferably includes a heat sink located between the two receptacle connectors. The heat sink preferably is an extrusion or bent sheet metal. The heat sink preferably defines air flow paths. The heat sink is preferably mounted to the heat dissipation module such that a position of the heat sink is fixed when the transceiver is mated with the one of the receptacle connectors. Channels in the heatsink are preferably no larger than one quarter of a wavelength of a dominant emitted electromagnetic interference generated, when the transceiver is mated with the transceiver, by electrical signals transmitted and/or received by the transceiver.

A blower is preferably mounted adjacent to the heat sink such that the blower directs forced air over the heat sink. Air preferably flows in one or more air-flow paths between the two receptacle connectors.

Only the cage is preferably configured to be press-fit or surface mounted to a substrate.

An electrical connector according to a preferred embodiment of the present invention includes a housing, high-speed and low-speed electrical contacts in the housing, high-speed cables electrically connected to the high-speed electrical contacts, and low-speed cables and a power filter electrically attached to the low-speed electrical contacts.

Preferably, high-speed is at least 25 Gbits/sec data transmission speed, and low-speed is less than 25 Gbits/sec data transmission speed.

An electrical connector system according to a preferred embodiment of the present invention includes a cage with a first end and a second end opposed to the first end, and two electrical connectors located at the second end. The first and second ends define a transceiver-mating direction such that when a transceiver is inserted into the first end of the cage in the transceiver-mating direction the transceiver mates with one of the two electrical connectors, and in the cage, air flows parallel to the transceiver-mating direction between the first and second ends and flows between the two electrical connectors.

Preferably, the cage includes press-fit tails, and the two electrical connectors do not include press-fit tails, through-hole tails, or surface-mount tails. Preferably, the two electrical connectors are receptacle connectors each including a signal conditioner electrically connected to cables. Preferably, only the cage is configured to be press-fit or surface mounted to a substrate.

An electrical connector system according to a preferred embodiment of the present invention includes a cage with a first end and a second end opposed to the first end, and two electrical connectors located at the second end. The first and second ends define a transceiver-mating direction such that, when a transceiver is inserted into the first end of the cage in the transceiver-mating direction, the transceiver mates with one of the two electrical connectors, and the two electrical connectors are spaced apart from each other such that, in the cage, air flows parallel to the transceiver-mating direction between the first and second ends and flows between the two electrical connectors.

The electrical connector system further preferably includes a heat sink located between the two electrical connectors. Preferably, air flows in one or more air-flow paths between the two electrical connectors.

A rack mount according to a preferred embodiment of the present invention includes an electrical connector or an electrical connector system according to the various preferred embodiments of the present invention. An electronics enclosure according to a preferred embodiment of the present invention includes one or more rack mounts of according to various preferred embodiments of the present invention.

A preferred embodiment of the present invention includes a QSFP electrical connector and cage according to SFF-8438, in which the QSFP electrical connector is an edge-card connector that is devoid of press-fit or mounting tails. A preferred embodiment of the present invention includes a stacked QSFP electrical connector and a cage, in which the stacked QSFP type of electrical connector includes an edge-card connector that is devoid of press-fit or mounting tails.

An electrical connector system according to a preferred embodiment of the present invention includes a substrate, a first cage with a first end and a second end opposed to the first end and mounted to a first side of the substrate, a first electrical connector located at the second end of the first cage, a second cage with a first end and a second end opposed to the first end and mounted to a second side of the substrate opposite the first side, and a second electrical connector located at the second end of the second cage. The first and second ends of the first and second cages define a transceiver-mating direction such that, when a transceiver is inserted into the first end of the first or second cage in the transceiver-mating direction, the transceiver mates with the first or second electrical connectors, and air flows parallel to the transceiver-mating direction between the first and second ends of both the first and second cages.

An electrical connector system according to a preferred embodiment of the present invention includes a cage with a first end and a second end opposed to the first end and with a slot extending between the first and second ends, an electrical connector located at the second end, and a heat sink or a heat spreader rigidly attached to the cage. The first and second ends define a transceiver-mating direction such that, when a transceiver is inserted into the slot at the first end of the cage in the transceiver-mating direction, the transceiver mates with the electrical connector, and when a transceiver is inserted into the slot, the transceiver is pushed against a side of the slot in the cage adjacent the heat sink or the heat spreader.

Preferably, a spring pushes the transceiver against the side of the slot.

An electrical connector system according to a preferred embodiment of the present invention includes a cage with a first end and a second end opposed to the first end and with a slot that extends between the first and second ends, and an electrical connector located at the second end. The first and second ends define a transceiver-mating direction such that, when a transceiver is inserted into the slot at the first end of the cage in the transceiver-mating direction, the transceiver mates with the electrical connector, and the electrical connector mechanically floats in a direction orthogonal or substantially orthogonal to the transceiver-mating direction and does not mechanically float in a direction parallel or substantially parallel to the transceiver-mating direction.

The electrical connector is preferably removed using a tool inserted into the first end of the slot.

An electrical connector system according to a preferred embodiment of the present invention includes a substrate, a cage connected to the substrate, including a first end and a second end opposed to the first end, and including a slot that extends between the first and second ends, and an electrical connector located at the second end. The first and second ends define a transceiver-mating direction such that, when a transceiver is inserted into the slot at the first end of the cage in the transceiver-mating direction, the transceiver mates with the electrical connector, and the distance between the electrical connector and substrate is allowed to float and a flexible electrical connection connects the electrical connector and the substrate.

An electrical connector according to a preferred embodiment of the present invention includes a heat dissipation module with a first end and a second end opposed to the first end, two receptacle connectors located at the second end, and a passageway that extends from the first end to the second end and that is positioned adjacent to one of the two receptacle connectors. The first and second ends define a transceiver-mating direction such that, when a transceiver is inserted into the first end of the heat dissipation module in the transceiver-mating direction, the transceiver mates with one of the two receptacle connectors, and in the heat dissipation module, heat in the passageway travels through the passageway parallel to the transceiver-mating direction and escapes through the first and second ends.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

FIG. 1 is a perspective view of a portion of rack mount according to a preferred embodiment of the present invention.

FIG. 3 is a perspective view of a portion of a heat-dissipation module shown in FIG. 1.

FIG. 4 is a schematic cross-section of a portion of a rack mount in a belly-to-belly configuration according to a preferred embodiment of the present invention.

FIG. 25 is a perspective sectional view of a receptacle with heat-transferring fins.

DETAILED DESCRIPTION OF PREFERRED EMBODIMENTS

Figure 2A:
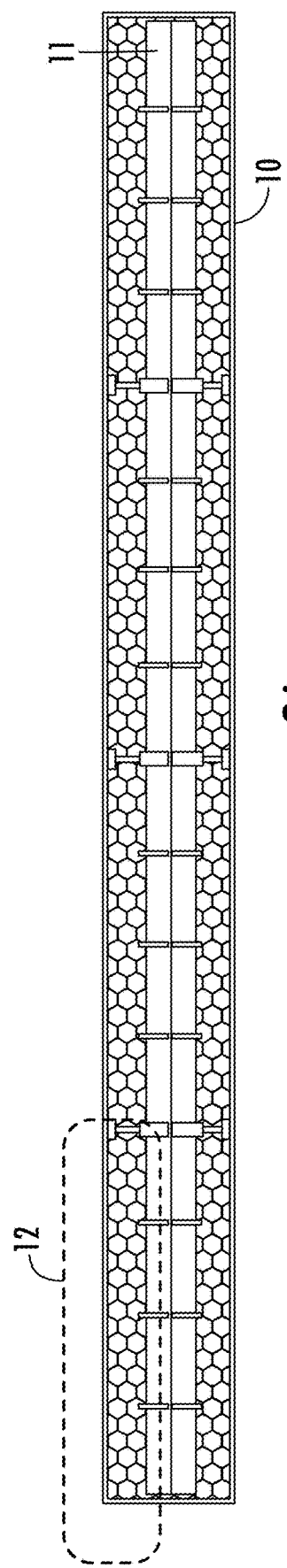
FIG. 2A is a front view of the rack mount shown in FIG. 1.

A preferred embodiment of the present invention provides a low-impedance thermal path between a transceiver and the ambient environment. Heat transfer to the ambient environment is provided by forced convective air flow across a heat sink. The heat sink is incorporated into the front bezel of a heat-dissipation module that can be mounted to an electronics rack. The heat sink can provide cooling for a plurality of transceivers. This contrasts with many prior art transceivers in which the heat sink is incorporated directly into the transceiver. The preferred embodiments of the present invention advantageously provide superior cooling for a large number of transceivers that are densely connected in an electronics rack.

FIG. 1 shows a portion of rack mount 60. The rack mount 60 includes a heat-dissipation module 10, a printed circuit board (PCB) 50, a heat sink 12, a transceiver 30, and a cable 31. The transceiver 30 is preferably an optical transceiver, and the cable 31 is preferably an optical cable. The transceiver 30 can use one of many industry standard transceiver formats such as QSFP+, PCIe, CXP, CFP, SFP, etc. In particular, the transceiver 30 can meet the requirement of SFF-8438 (INF-8438i, Rev. 1.0, hereby incorporated by reference in its entirety). The preferred embodiments of the present invention are not limited to these standard transceiver formats, and any transceiver can be used including proprietary transceivers or developing transceiver formats, such as OSFP and mini-OSFP. The OSFP format, Octal Small Form-Factor Package, supports 8 fully duplexed communication channels. That is, the format has 8 independent transmission channels and 8 independent receiver channels. Incorporated into any of these transceiver formats can be a silicon photonic element that provides modulation and/or receive functions; however, this is not a requirement. In FIG. 1, the transceivers 30 are shown adjacent to their respective mating slot 11 in the heat-dissipation module 10. In operation, the transceivers 30 can be plugged into their respective slots 11. The rack mount 60 does not need to include spring-biased heat sinks. The heat sinks 12 can be formed directly by the heat-dissipation module 10 and not separate finned structures positioned behind a front bezel or a panel of a system or a rack.

For clarity, the PCB 50 shown in FIG. 1 is not populated with any electronic components; however, in practice the PCB 50 can have various electronic components that support high-speed computing and communication. The PCB 50 can be connected to a plurality of heat-dissipation modules 10. Each module 10 includes a heat sink 12, a cage 16, and a slot 11 for a transceiver 30. The heat-dissipation module 10 is described in more detail below. Connected in the slots 11 of the heat-dissipation module 10 can be one or more transceivers 30. In FIG. 1, four transceivers 30 are connected to each module; however, the module can be configured to accept more or less than four transceivers 30. Each transceiver 30 is connected to a cable 31 that provides communication between the PCB 50 and some other element in a data network. As previously mentioned, the transceiver 30 is preferably an optical transceiver, and the cable 31 is preferably an optical cable that contains one or more optical fibers. In FIG. 1, four heat-dissipation modules 10 are connected to the top the PCB 50, and four heat-dissipation modules 10 are connected to the bottom of the PCB 50. Each heat-dissipation module 10 is capable of accepting four transceivers 30 so a total of 32 transceivers can be connected to the PCB 50 as shown in FIG. 1. The transceivers 30 mounted above the PCB 50 can make electrical connections to the top of the PCB 50, and the transceivers 30 mounted below the PCB 50 can make electrical connections to the bottom of the PCB 50. This transceiver configuration is referred to as "belly-to-belly" and allows for short electrical paths between the transceiver 30 and the PCB 50 facilitating transmission of high-bandwidth signals, such as, 10 Gbps, 28 Gbps, 56 Gbps, or even higher bandwidths.

FIG. 2A shows an end view of a portion of a rack mount 60. In FIG. 2A, the transceivers 30 have been removed for clarity. FIG. 2A shows eight heat-dissipation modules 10. Each heat-dissipation module 10 has slots 11 for four transceivers 30. Each slot 11 is surrounded by an electrical conductor, such as a metal, forming a cage 16 that provides electromagnetic shielding between transceivers 30 situated in adjacent slots 11. The PCB 50 is not clearly visible in FIG. 2A, but would be situated between the upper and lower rows of heat-dissipation modules 10 as shown in FIG. 1. Connectors, which would be mounted to the PCB 50 to accept each transceiver 30, are also not shown in FIG. 2A. Each heat-dissipation module 10 has a heat sink 12 including a web of material with air passages running completely through the heat sink 12 along a front to back transceiver insertion direction. In FIG. 2A, the transceiver insertion direction extends into the drawing page. The heat sink 12 associated with each heat-dissipation module 10 provides cooling for all four transceivers 30 that can be mounted in the slots 11. The transceivers 30 themselves do not need any type of finned structure to dissipate heat into the surrounding atmosphere because they are cooled by conduction to the heat sink 12 of the heat-dissipation module 10 and perhaps forced air blowing through the heat sinks 12 along the transceiver insertion direction. Electromagnetic shielding (not visible in FIG. 2A) can be provided between the heat-dissipation modules 10 to reduce stray electromagnetic radiation.

Figure 2B:
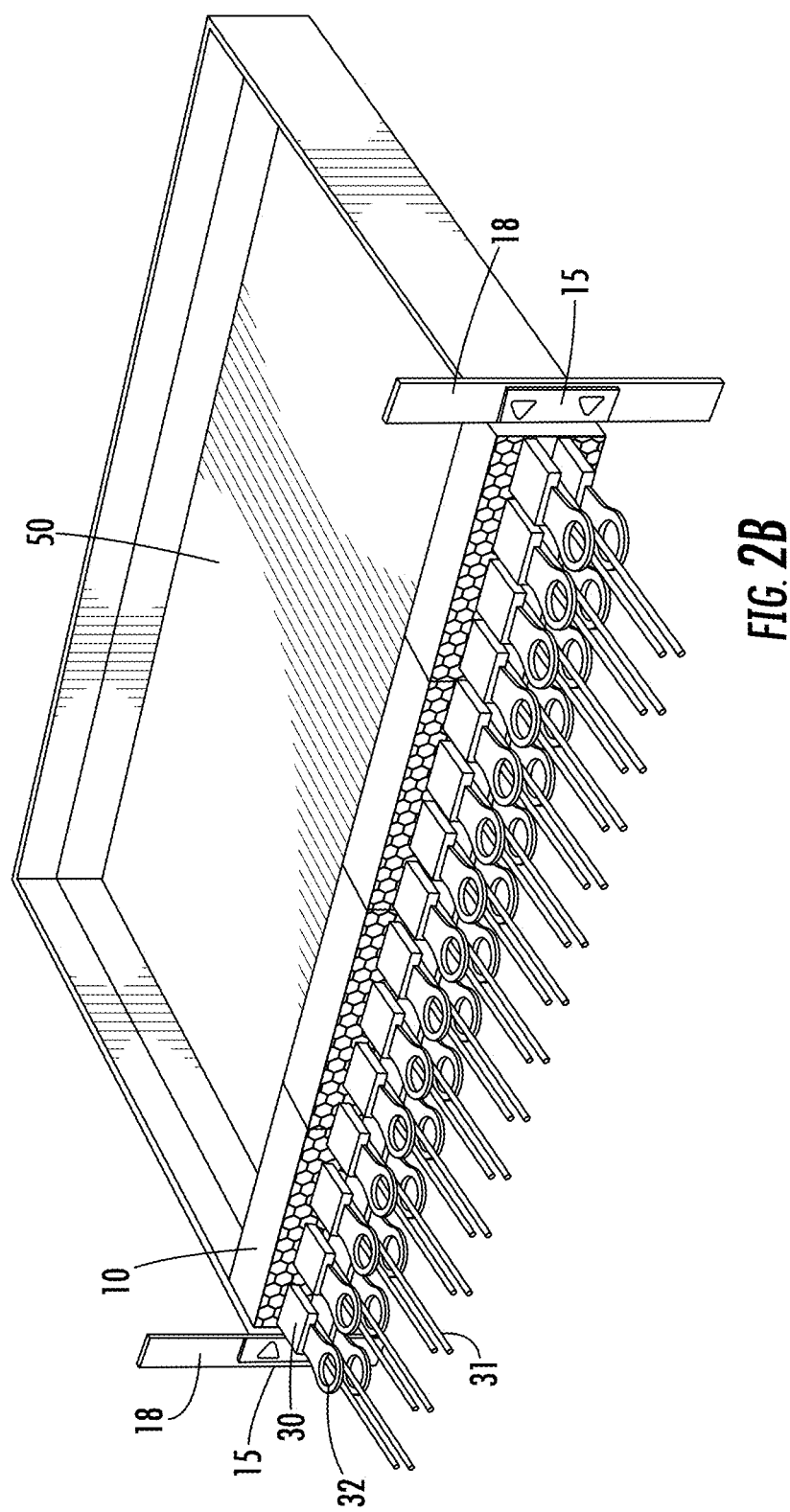
FIG. 2B is a perspective view of the rack mount shown in FIG. 1.

FIG. 2B shows a perspective view of a rack mount 60 with a heat-dissipation module 10. Four heat-dissipation modules 10 are situated above an edge of PCB 50 and four heat-dissipation modules 10 are situated below an edge of the PCB 50. The heat-dissipation modules 10 are fully populated with transceivers 30. A cable 31 is connected to each transceiver 30, and each transceiver 30 can have a pull ring 32 for easy removal from the heat-dissipation module 10.

Flanges 15 can be located on the sides of the heat-dissipation module 10 to secure the rack mount 60 to the sides of an electronics rack. Representative dimensions for a rack mount 60 are shown in FIG. 2B. Rack mount 60 can be compatible with mounting in a 19-inch rack. The height rack mount 60 can be approximately 1.375 inches, and the opposing sides of the mounted transceivers 30 can be separated by approximately 0.582 inches. These dimensions are compatible with the heat-dissipation module 10 occupying 1 U of rack height (1 U=1 rack unit=1.75" high). These values are exemplary only, and the dimensions can be adjusted as required to best suit the intended application. In practice, many of these rack mounts 60 can be stacked one above the other in an electronics rack.

FIG. 3 shows a single heat-dissipation module 10. The heat-dissipation module 10 includes slots 11 for four transceivers 30 and a heat sink 12. The slots 11 can include latching features, not shown in FIG. 3, that help to secure a plugged transceiver 30 in position. The slots 11 can also include flexible members, not shown in FIG. 3, that lightly slide against the sides of the transceiver 30 to provide electromagnetic shielding. The heat sink 12 includes a web of material providing a large surface area for convective heat transfer of air flowing through the heat sink 12. In FIG. 3, the air is depicted as flowing out the heat sink 12 in direction A; however, the air direction can be reversed, i.e. the front-to-back transceiver insertion direction instead of back-to-front as shown. A fan (not shown in FIG. 3) can be mounted on the front, back, or sides of the heat-dissipation module 10, although this is not a requirement. A fan can be mounted somewhere else in the electronics rack (not shown in FIG. 3) that supports the heat-dissipation module 10. Instead of a fan, a duct can bring forced air to the electronics rack. The fan or duct can then draw or force air through the heat sink 12 along direction A or along the transceiver insertion direction (180 degrees opposite of direction A). The heat sink 12 webbing can be designed so that it is thicker in the region of the heat sink 12 adjacent to the slot 11 to provide enhanced thermal conductance to regions of the heat sink 12 farther away from the slot 11. A hexagonal web pattern is shown in FIG. 3; however, the web pattern can take many forms such as squares, rectangles, diamonds, triangles, serpentine, etc. The web pattern also need not be a regular pattern, but could have a random structure. The heat sink 12 provides a large surface area for convective heat transfer and a low-impedance conductive path between the transceiver 30 and the convective surface area.

The heat-dissipation module 10 can be fabricated from a metal extrusion or from sheet metal. The heat-dissipation module 10 can be made of aluminum, copper, steel, or some composite of these materials; however, any material that has high electrical and thermal conductivity can be used. A coating or surface treatment can be applied to the material forming the heat-dissipation module 10. Electrical conductivity is important because the heat sink 12 can help provide electromagnetic shielding to reduce electromagnetic interference (EMI) between the many transceivers 30 that can populate an electrical rack and to reduce stray EMI outside of the rack to acceptable levels. To provide adequate EMI shielding, gaps between the webbing of the heat sink 12 should be less than a quarter of the shortest wavelength of interest in the radiated electromagnetic energy spectrum. For a system operating at 28 Gbps the EMI is predominately emitted up to a frequency of 14 GHz, so that a gap between the web elements can be approximately 5 mm or less. For units with higher frequencies of interest, the gaps can be proportionally smaller to achieve a similar level of shielding. The depth d of the heat sink 12 should be adequate to completely cover the electrical connection into the PCB 50 to provide effective EMI shielding and provide for adequate heat transfer. Thermal modeling indicates that the depth d is preferably between 20 mm and 60 mm, although shorter and longer depths can be used. The height h of the heat sink 12 can also be chosen to provide adequate heat transfer as well as a compact design so that the belly-to-belly transceiver configuration shown in FIG. 2A can be mounted in a 1 U (1 U=1 rack unit=1.75" high) rack opening. Thermal modeling indicates that a height h of approximately 18 mm should provide adequate thermal dissipation and fit within a 1 U rack opening. Smaller or larger heights h can be used, for example, if the system is designed to fit into a 2 U rack opening or to accommodate different connector or transceiver sizes in different configurations.

FIG. 4 shows a rack mount 60 with a belly-to-belly configuration. Upper and lower connectors 20a, 20b are mounted to the top and bottom of PCB 50, respectively. The upper connector 20a provides electrical paths between the upper transceiver 30a and PCB 50. Similarly, the lower connector 20b provides electrical paths between the lower transceiver 30b and the PCB 50. These electrical paths can use one or more central conductors surrounded as much as possible by an electrically grounded shield to maximize transmission and minimize distortion of high bandwidth signals transmitted along the electrical connectors. Both the upper and lower transceivers 30a, 30b are pluggable and can mate and unmate with their respective electrical connector 20a, 20b. Upper and lower cables 31a, 31b are attached to the upper and lower transceivers 30a, 30b, respectively. These cables 31a, 31b transmit and/or receive data.

Also shown in FIG. 4 are two springs 14a, 14b. The springs 14a, 14b ensure robust physical contact between the heat sink 12a, 12b and the transceivers 30a, 30b, which are the major heat generating components. The springs 14a, 14b force the upper and lower transceivers 30a, 30b against their respective heat sinks 12a, 12b. This ensures a low-impedance thermal path between the transceivers 30a, 30b and the heat sinks 12a, 12b, minimizing the operational temperature of the transceivers 30a, 30b. It is generally desirable to operate the transceivers 30a, 30b at temperatures as close to room temperature as possible. Operating temperatures equal or less than 30° C. above an ambient data center environment are generally acceptable. Thermal modeling has indicated that the design shown in FIG. 4 provides heat dissipation well in excess of this requirement. The modeling indicates that the transceiver operating temperature can be approximately 6° C. above ambient for a 5 watt heat load from each transceiver 30a, 30b. Providing better cooling and a lower transceiver operating temperature advantageously increases the operating lifetime of any laser diodes in the upper and lower transceivers 30a, 30b. While the springs 14a, 14b are shown as leaf springs in FIG. 4, the springs 14a, 14b can take many forms, or the force between the transceivers 30a, 30b and heat sinks 12a, 12b can be provided by some other mechanism that ensures robust physical contact between the transceivers 30a, 30b and the heat sink 12a, 12b.

Figure 8:
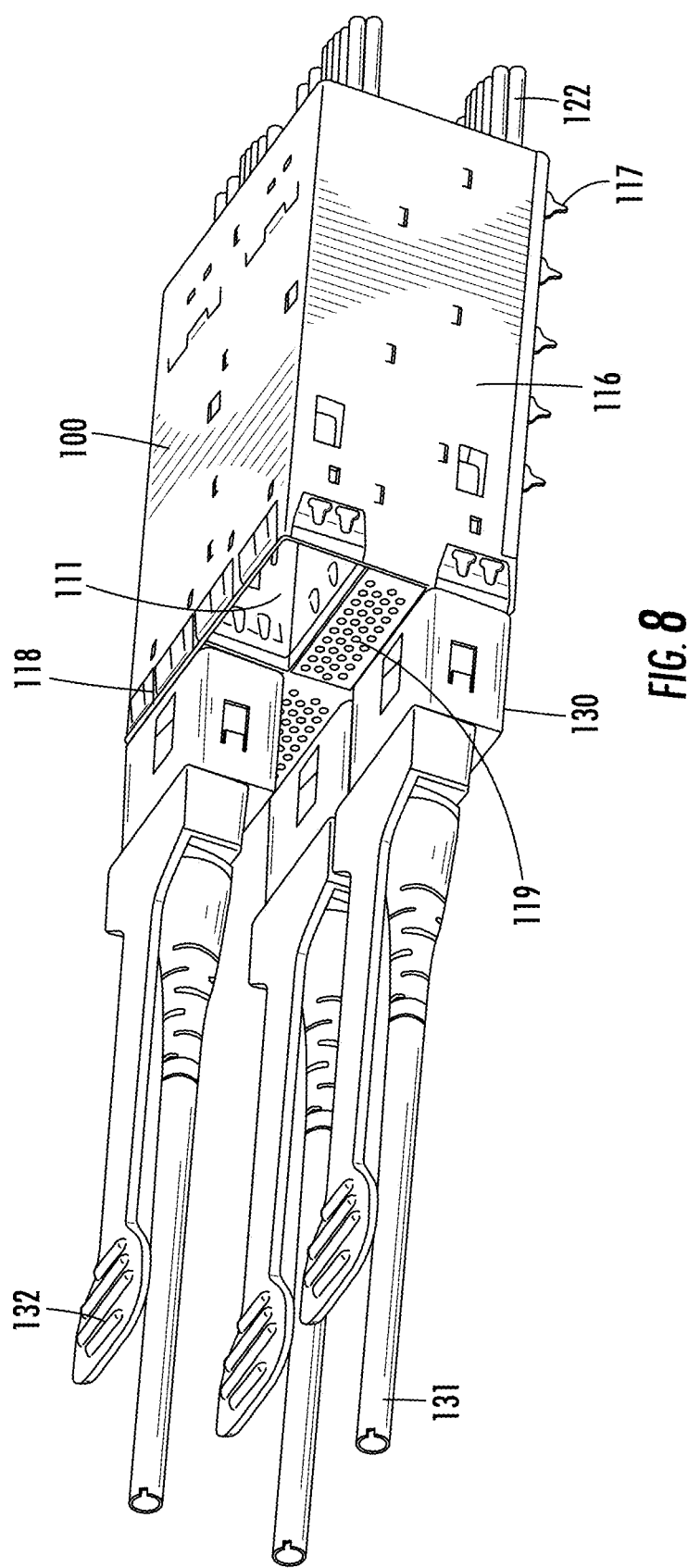
FIG. 8 is a perspective view of a receptacle according to a preferred embodiment of the present invention.

An advantage of the belly-to-belly configuration shown in FIG. 4 is that both the upper and lower transceiver 30a, 30b are located adjacent to the PCB 50 such that the electrical paths between the transceivers 30a, 30b and PCB 50 is short. This allows transmission of high-bandwidth signals with minimal loss and interference. However, other suitable configurations can be used. Although upper and lower connectors 20a, 20b are shown as PCB mounted board connectors, connectors 20, 20b can also be cable connectors that include cable connectors as shown in FIG. 8.

Figure 5A:
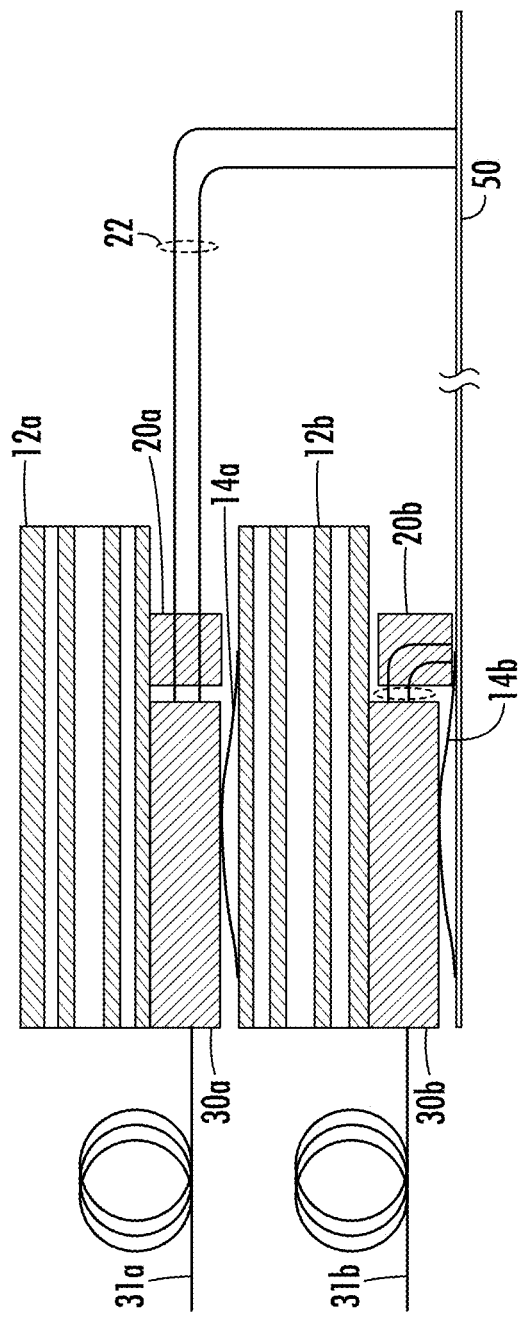
FIGS. 5A, 5B, and 5C are schematic cross-sections of a portion of a rack mount in a stacked configuration according to a preferred embodiment of the present invention.
Figure 5B:
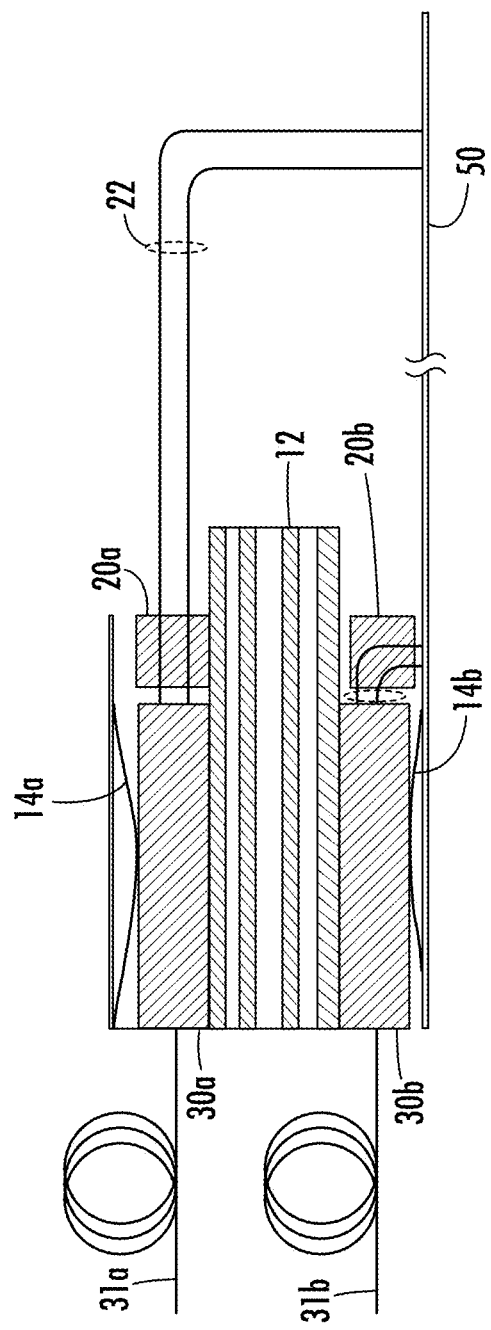
Figure 5C:
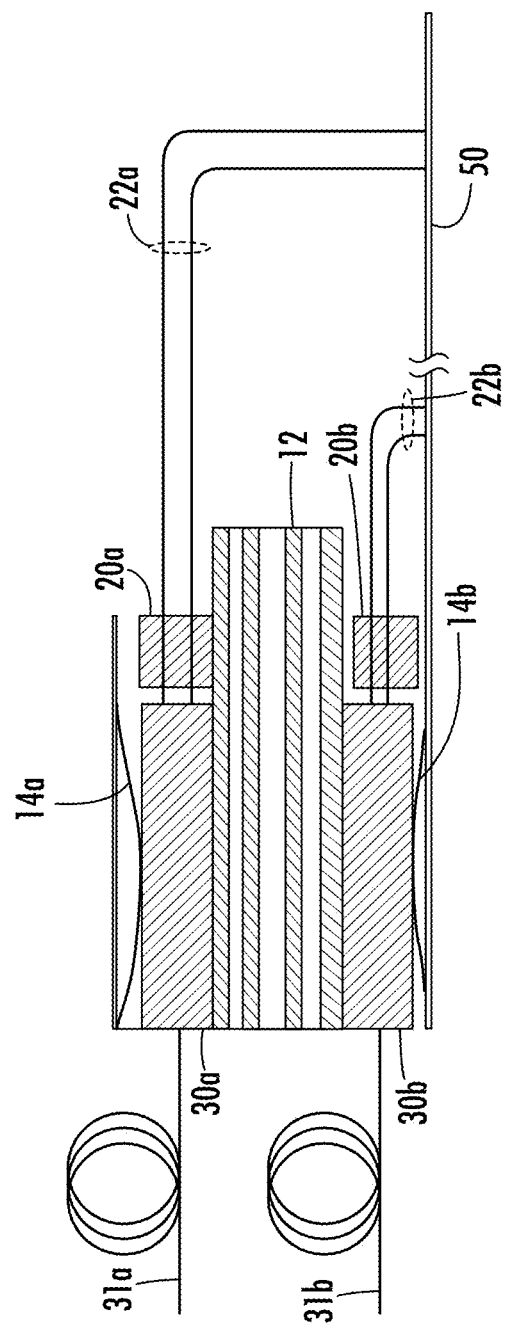

FIGS. 5A-5C show alternative stacked configurations. In these stacked configurations, the lower transceiver 30b is adjacent to the PCB 50, and the upper transceiver 30a is positioned above the lower transceiver 30b farther from the PCB 50. The upper and lower transceivers 30a, 30b are connected to upper and lower cables 31a, 31b, respectively.

As shown in FIGS. 5A and 5B, the lower connector 20b can be identical or similar to the lower connector 20b in FIG. 4 in which the lower connector 20b is directly connected to the PCB 50. In FIG. 5A, above the lower transceiver 30b is a lower heat sink 12b, which serves to dissipate heat generated in the lower transceiver 30b. A lower spring 14b forces the lower transceiver 30b against the lower heat sink 12b, ensuring a low impedance thermal path between them. An upper spring 14a, which can be identical or different than the lower spring 14b, is positioned between the lower heat sink 12b and the upper transceiver 30a. The upper spring 14a can also be positioned so it is fully contained into the heat-dissipation module 10. The upper spring 14a forces the upper transceiver 30a against the upper heat sink 12a, ensuring a low impedance thermal path between them. The upper heat sink 12a serves to dissipate heat generated in the upper transceiver 30a. An upper connector 20a mates with the upper transceiver 30a. Flyover cables 22 provide an electrical path between the upper connector 20a and the PCB 50. The cables 22 can be any suitable shielded electrical connections, including one or more coaxial, or twin axial cables. The cables 22 can be rigid, semi-ridge, or flexible. Flexible twin axial, i.e. twinax, cable is preferably used because it readily allows propagation of differential high-speed electrical signals and can be easily routed to any location on the PCB 50 with minimal loss and distortion. The cables 22 can fly over the PCB 50 as described in commonly assigned U.S. provisional patent application 62/131,989, which is hereby incorporated by reference in its entirety. An advantage of the stacked configuration is that all the high-speed electrical connections can be made on a single side of the PCB 50. Also, the component height on the PCB 50 can be approximately twice as high compared to that available in the belly-to-belly configuration. Another advantage of this preferred embodiment is that both the upper and lower heat sinks 12b can be formed monolithically in a single extrusion step.

In FIGS. 5B and 5C, the heat-dissipation module 10 includes a single heat sink 12. A lower spring 14b forces the lower transceiver 30b against the heat sink 12, ensuring a low impedance thermal path between them, and an upper spring 14a, which can be identical or different than the lower spring 14b, forces the upper transceiver 30a against the heat sink 12, ensuring a low impedance thermal path between them. In FIG. 5B, the lower connector 20b is connected directly to the PCB 50, and the upper connector 20a is connected to the PCB 50 by cables 22. In FIG. 5C, the lower connector 20b is connected to the PCB 50 by cables 22b, and the upper connector 20a is connected to the PCB 50 by cables 22a. It is also possible that the lower connector 20b includes some electrical paths that are directly connected to the PCB 50 as shown in FIG. 5B and some electrical paths that are connected to the PCB 50 by cables 22b as shown in FIG. 5C.

Figure 6:
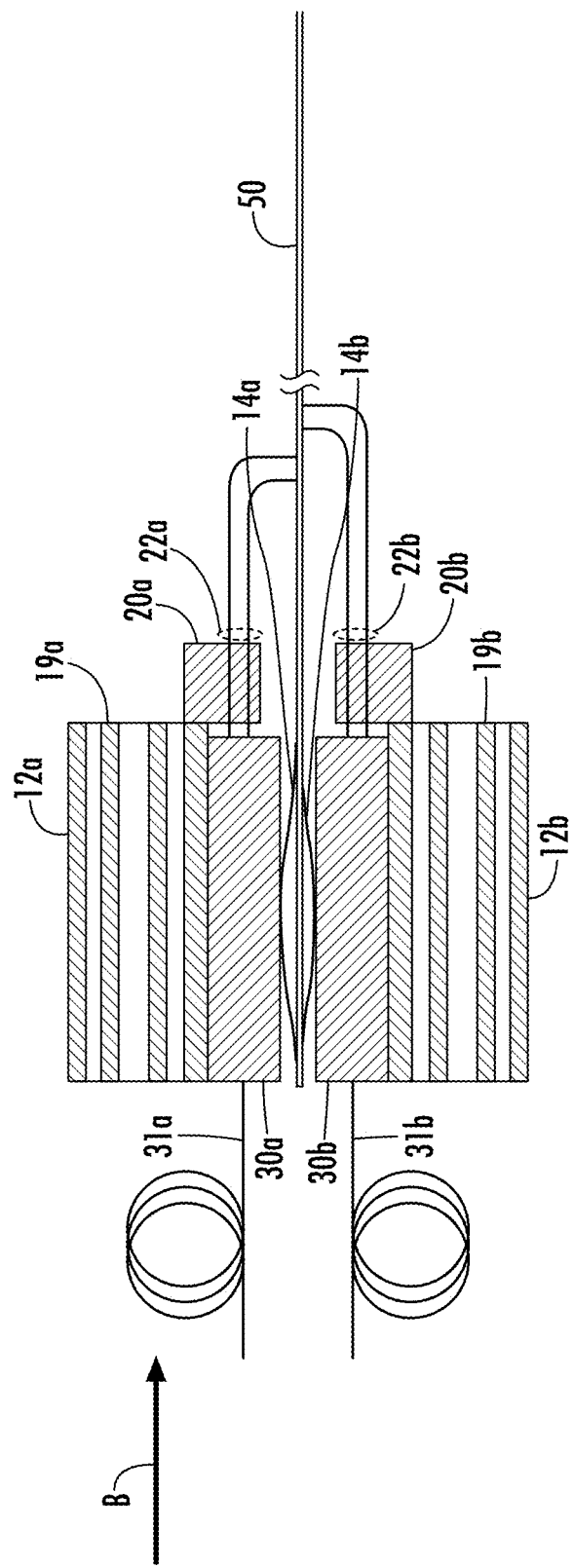
FIG. 6 shows a schematic cross-section of a portion of a rack mount in a belly-to-belly configuration with electrical connectors according to a preferred embodiment of the present invention.

FIG. 6 shows a portion of a rack mount 60 with a belly-to-belly configuration with connectors 20a, 20b attached to heat sinks 12a, 12b. This preferred embodiment is similar to that shown FIG. 4, and so, only the differences between the figures will be described. A difference between the preferred embodiment shown in FIG. 4 and the preferred embodiment shown in FIG. 6 is the mounting of the connectors 20a, 20b. In FIG. 4, the connectors 20a, 20b are connected directly to the PCB 50. As mentioned above, this has the advantage of providing a short, rigid electrical path between the connectors 20a, 20b and the PCB 50. However, this fixed, rigid mounting can result in an unfavorable tolerance stack up. In some cases it can be difficult to force the transceivers 30a, 30b to be flush with the heat sinks 12a, 12b while they are simultaneously mating with the connectors 20a, 20b. The preferred embodiment shown in FIG. 6 solves this problem. In FIG. 6, the upper and lower connectors 20a, 20b are mounted on the upper and lower heat sinks 12a, 12b, respectively. The upper and lower connectors 20a, 20b can be mounted to surfaces 19a, 19b of heat sinks 12a, 12b so that the upper and lower connectors 20a, 20b can move in directions parallel to surfaces 19a, 19b of the heat sinks 12a, 12b. Similarly the connectors 20a, 20b can be mounted within the length of the heat dissipation module 10 in such a way, with guides or grooves for examples but not so limited, that the connectors 20a, 20b are free to move in a direction parallel or substantially parallel to surface 19a, 19b of the heat sinks 12a, 12b. The connectors 20a, 20b in FIG. 6 are, however, constrained in a direction parallel or substantially parallel to the insertion direction of the transceivers 30a, 30b, which is perpendicular or substantially perpendicular to surfaces 19a, 19b. This mounting configuration allows the connectors 20a, 20b to float in directions perpendicular or substantially perpendicular to the transceiver mating direction, but be rigidly constrained in the mating direction. Because the connectors 20a, 20b can float in a vertical direction, the springs 14a, 14b can force the transceivers 30a, 30b against their respective heat sinks 12a, 12b with little concern for possible lack of contact between the transceivers 30a, 30b and heat sinks 12a, 12b because of tolerance stack up. Because the upper and lower connector positions relative to the PCB 50 in this preferred embodiment are no longer fixed, cables 22a, 22b similar to those described in relation to FIG. 5C can be used to provide the electrical paths between the connectors 20a, 20b and PCB 50. It is also possible that the connectors 20a, 20b can include some electrical paths that are directly connected to the PCB 50 as shown in FIG. 4 and some electrical paths that are connected to the PCB 50 by cables 22a, 22b as shown in FIG. 6.

Further configurations are possible. Both the belly-to-belly configuration shown in FIGS. 1, 2, 4, and 6 and the stacked configuration shown in FIGS. 5A-5C have the major surfaces, i.e., surfaces with the largest surface areas, of the transceivers 30, 30a, 30b parallel or substantially parallel to the plane of the PCB 50. This is not a requirement. The major surfaces of the transceivers 30, 30a, 30b can be oriented perpendicular or substantially perpendicular within manufacturing tolerances to the PCB plane. In this case, a flyover style electrical connection can be made to the PCB 50 as described in commonly assigned U.S. patent application Ser. Nos. 62/136,059, 62/107,671, and Ser. No. 14/845,990, which are each hereby incorporated by reference in their entirety. In these perpendicular configurations, heat sinks can be provided adjacent at least one of the major surfaces of the transceivers. In the stacked configuration, the position of the upper transceiver 30a and the upper heat sink 12a can be reversed, so that the lower and upper heat sinks 12b, 12a are adjacent to each other. Depending on the PCB component layout, these various configurations can be mixed and matched in any system to achieve an optimal layout to maximize signal integrity, thermal performance, density or other metrics, or any combinations thereof, for all channels in the communication network.

Figure 7:
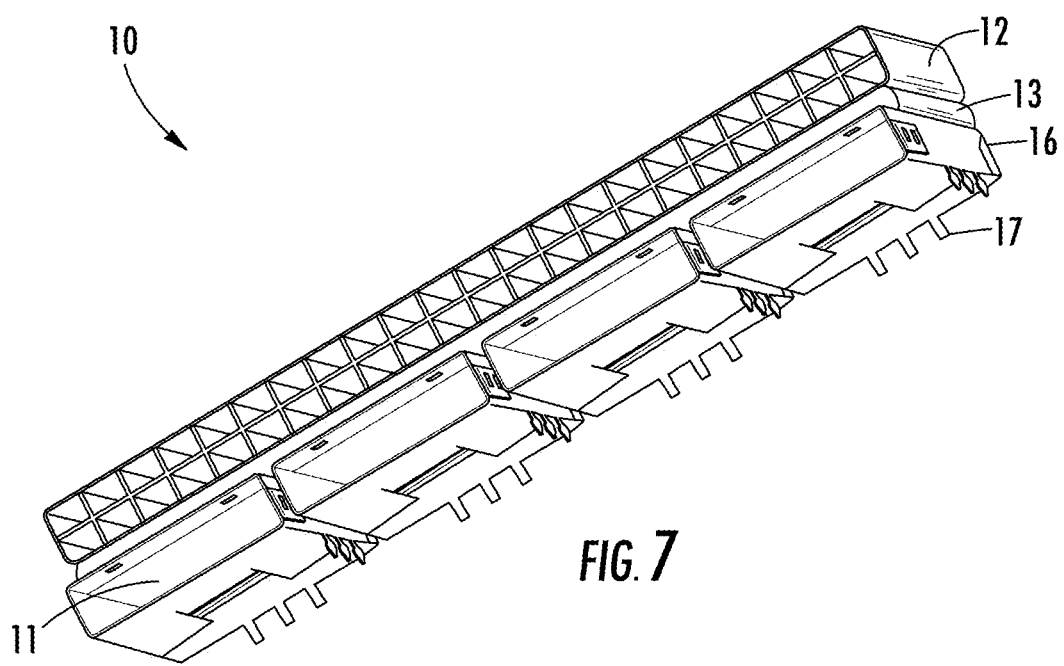
FIG. 7 is a perspective view of heat-dissipation module made of sheet metal according to a preferred embodiment of the present invention.

As previously mentioned, a heat-dissipation module 10 can be formed from sheet metal. FIG. 7 shows a sheet-metal heat-dissipation module 10. The overall layout is similar to that shown for an extruded heat-dissipation module 10 shown in FIG. 3. The heat-dissipation module 10 has a number of slots 11 to accept transceivers 30. Surrounding each slot 11 is a cage 16 to minimize EMI between the transceivers 30 and any circuitry. A heat spreader 13 is adjacent the top of the cage 16. The heat spreader 13 can be formed from a solid piece of metal and serves to distribute heat generated by transceivers 30 (not shown in FIG. 7) to the heat sink 12. The heat sink 12 can be formed from a web of bent-and-cut sheet metal. In FIG. 7, the web is shown as having square openings to allow air passage through the heat sink 12. As previously described, air passages of other shapes can be used. The heat-dissipation module 10 has a plurality of mounting pins 17 which connect to a PCB (not shown in FIG. 7). The sheet-metal heat-dissipation module 10 can be arranged in any of the above-described preferred embodiments. An advantage of the sheet metal formed heat-dissipation module 10 is that it can be cheaper and easier to manufacture than an extruded heat-dissipation module 10.

Instead of optical transceivers, electrical transceivers can be used. Also independent transmitters and/or receivers can be used instead of a transceiver. The placement of various components in the system can also be varied. For example, FIG. 4 shows the non-mating ends of the upper and lower transceivers 30a, 30b substantially flush with the end of the PCB 50. This is not a requirement. The transceivers can extend past the end of the PCB 50 or be recessed such that the end of the PCB 50 extends past the transceiver ends. The component placement has often been described in terms of an upper and lower component. It should be appreciated that these terms are relative to the PCB mounting orientation and can be exchanged or substituted by left/right depending on the orientation.

Preferred embodiments of the present invention also include a receptacle that can receive one or more transceivers and that includes a cage and electrical connectors in the cage. The electrical connectors can include both high- and low-speed cables that flyover a PCB to different locations on the PCB. Using low-speed cables provides additional space between the slots in a multi-slot cage, which allows increased airflow between the transceivers, improving cooling and heat management of the transceivers. The electrical connectors can be plugged into the rear of the cage. The electrical connectors can include latches that engage with latch slots in the cage. A blower can be used to improve cooling. Heat sinks (with or without forced air) can be provided in the extra space to improve cooling. A fluid-cooled heat sink, such as a heat pipe, can be provided in the extra space to further improve cooling.

An electrical-connector removal tool can be inserted into the front of the cage assembly to remove an electrical connector from the cage.

FIG. 8 shows a receptacle 100 according to a preferred embodiment to the present invention. The receptacle 100 includes a cage 116 with four slots 111 arranged in two rows. Each slot 111 can accept one transceiver 130. FIG. 8 shows three slots 111 mated with three transceivers 130 and one slot 111 that is empty. The bottom of the cage 116 includes mounting pins 116 that allow the receptacle 100 to be mounted to a PCB (not shown in FIG. 8). The receptacle 100 can include an optional a faceplate 119 between the upper and lower slots 111. The faceplate 119 can include a plurality of openings or louvers that allow air flow through the faceplate 119, through passageway 107 (FIG. 19), between receptacle connectors 120 (FIG. 19), and over cables 122. Stated another way, the openings or louvers are fluidly connected to an opening defined by the passageway 107 between receptacle connectors 120. The passageway 107 can extend from the first end to the second end and can be positioned adjacent to one of the two receptacle connectors. Air can also flow over the cables 122, between the receptacle connectors 120, through the passageway 107, and through the faceplate 119. In non-forced air systems, heat can escape from the passageway 107 through the first and second ends or through the faceplate 119 openings and a second-end opening positioned between the receptacle connectors 120. Stated another way, heat in the passageway can travel through the passageway 107 parallel to the transceiver-mating direction and escape through the first and second ends. The passageway 107 can be positioned adjacent and parallel to one of the slots 111, positioned between and parallel to two adjacent slots 111, or be positioned adjacent and parallel to at least one receptacle connector 120. The cage 116 can include a plurality of electromagnetic interference (EMI) shields 118 around its perimeter to limit radiated EM fields. The height of the cage 116 assembly can be compatible with mounting cage 116 and attached PCB within a 1 U rack opening. The receptacle 100 can be mounted in an electronics rack. The receptacle 100 includes cables 122 that extend from the rear of the cage 116. The cables 122 can transmit both high and low speed signals between the receptacle 100 and a PCB.

The transceiver 130 includes a cable 131 that transmit signals to and from the transceiver 130. The transceiver 130 can include a pull tab 132 that can be used to remove the transceiver 130 from the receptacle 130. The cables 131 flyover the PCB. The benefits of using of flyover cables for high-speed signals is described in commonly assigned U.S. patent application Ser. Nos. 62/136,059, 62/107,671, and Ser. No. 14/845,990.

Figure 9:
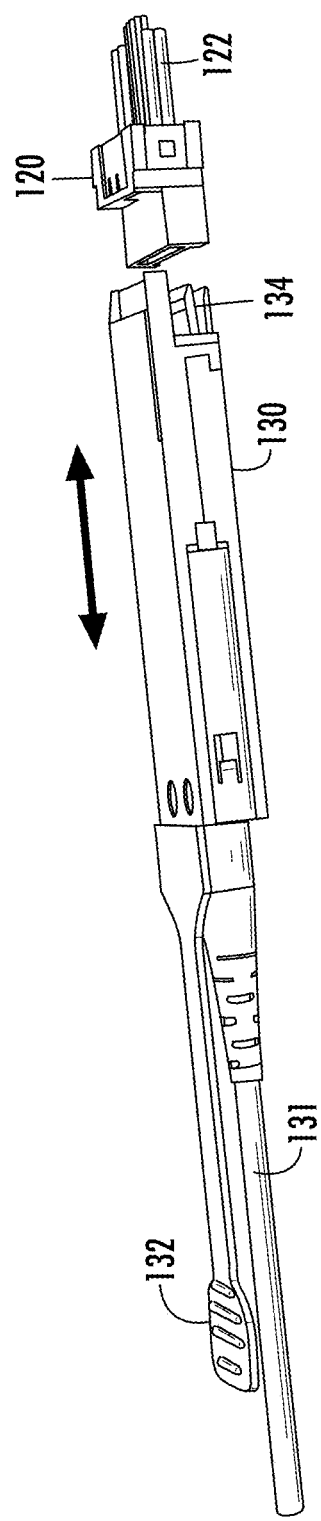
FIG. 9 is a perspective view of a transceiver and a receptacle connector according to a preferred embodiment of the present invention.

FIG. 9 shows a transceiver 130 and receptacle connector 120. The receptacle connector 120 is located within the cage 116 shown in FIG. 8. The transceiver 130 is mated to the receptacle 100 by inserting the transceiver 130 into the receptacle 100 such that the edge card 134 is inserted into the receptacle connector 120. The cables 122 extend from the rear of the receptacle connector 120. The cables 122 can be terminated to contacts in the receptacle connector 120 and to the PCB, creating an electrical path between the receptacle connector 120 and the PCB. The transceiver 130 can use one of many industry standard transceiver formats such as QSFP+, PCIe, CXP, CFP, SFP, etc. In particular, the transceiver 30 can meet the requirements of SFF-8438 (INF-8438i, Rev. 1.0).

Figure 10:
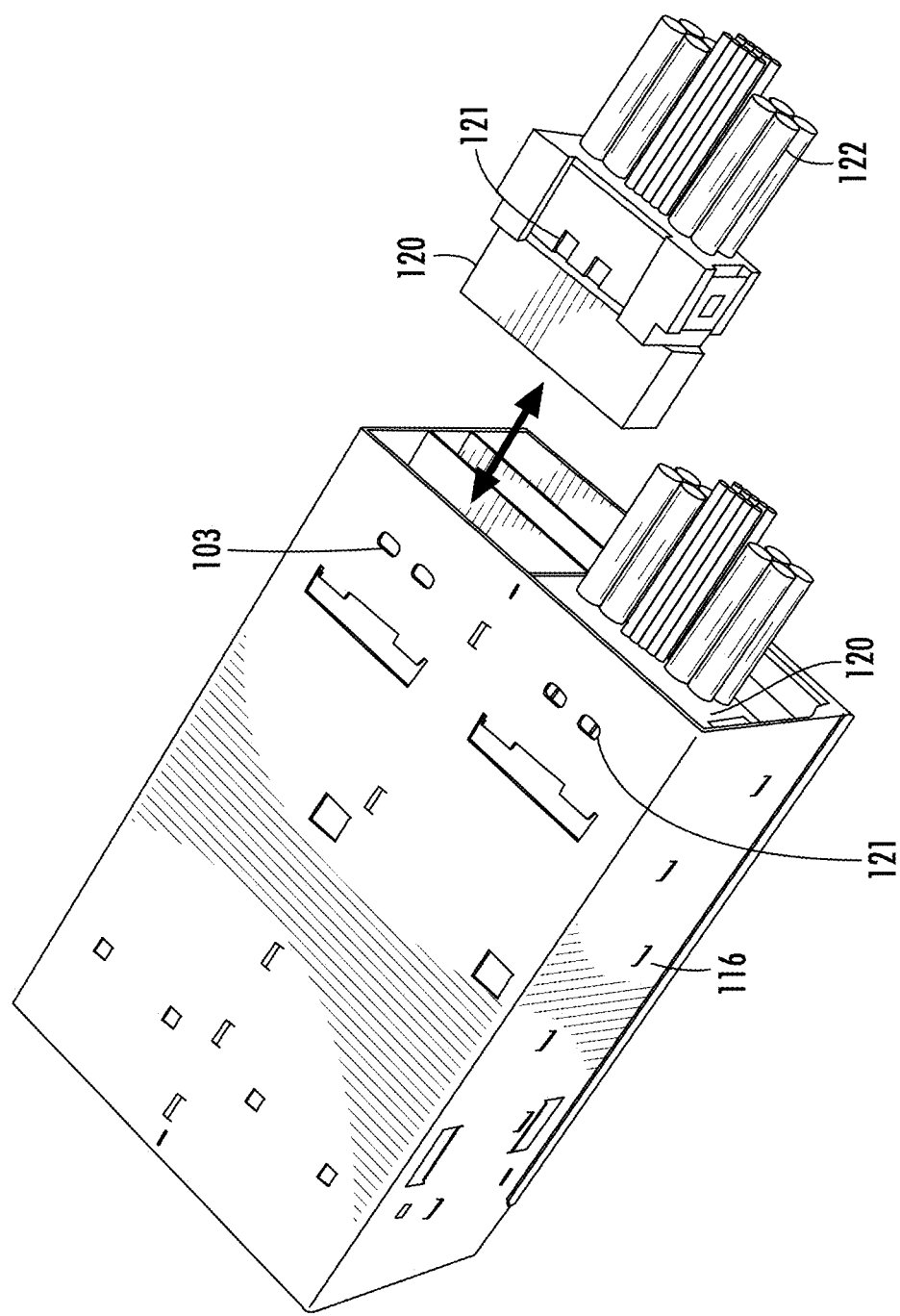
FIG. 10 is a rear perspective view of a receptacle connector being plugged into the cage.
Figure 11:
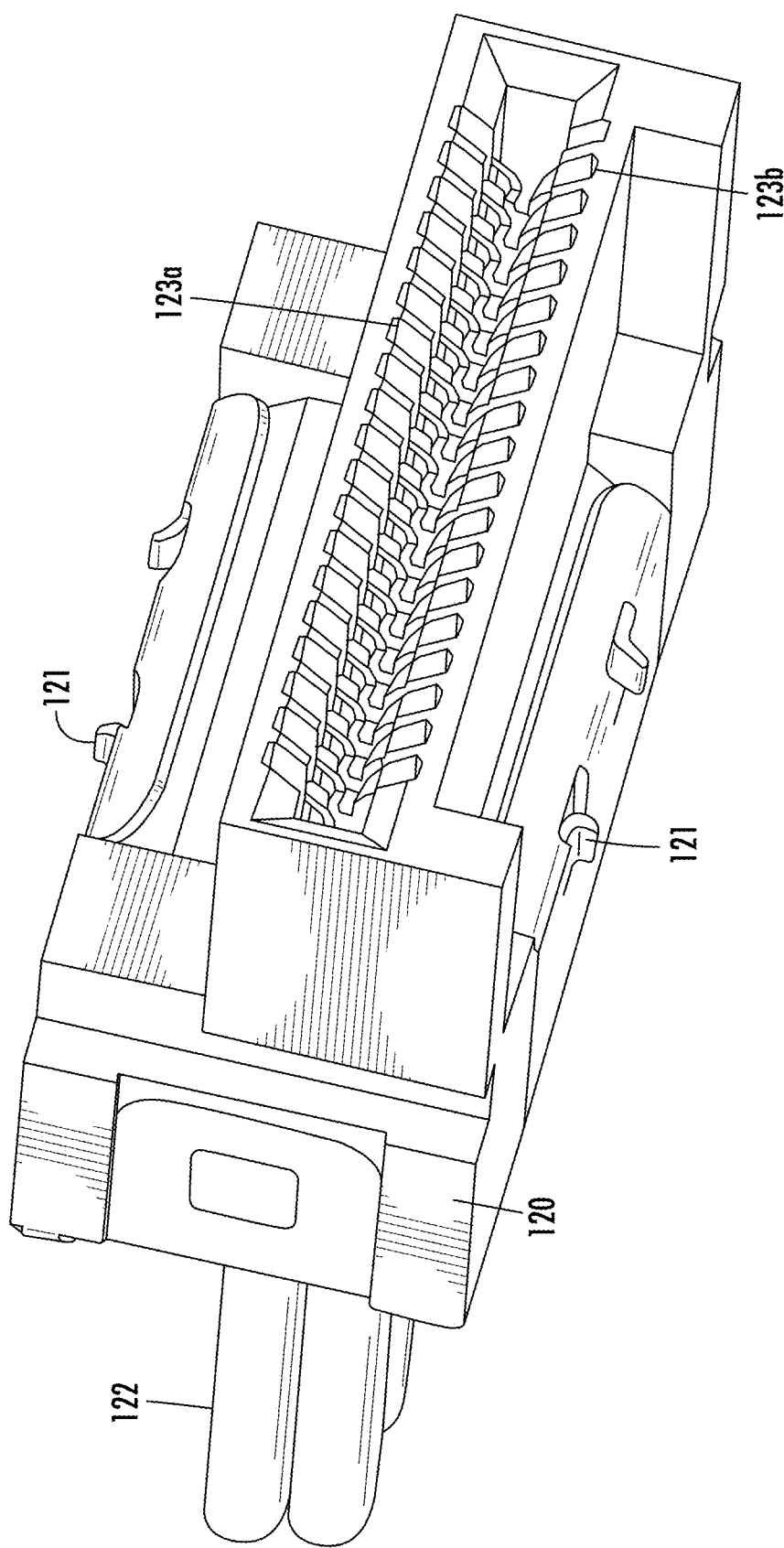
FIG. 11 is a front perspective view of the receptacle connector.
Figure 12:
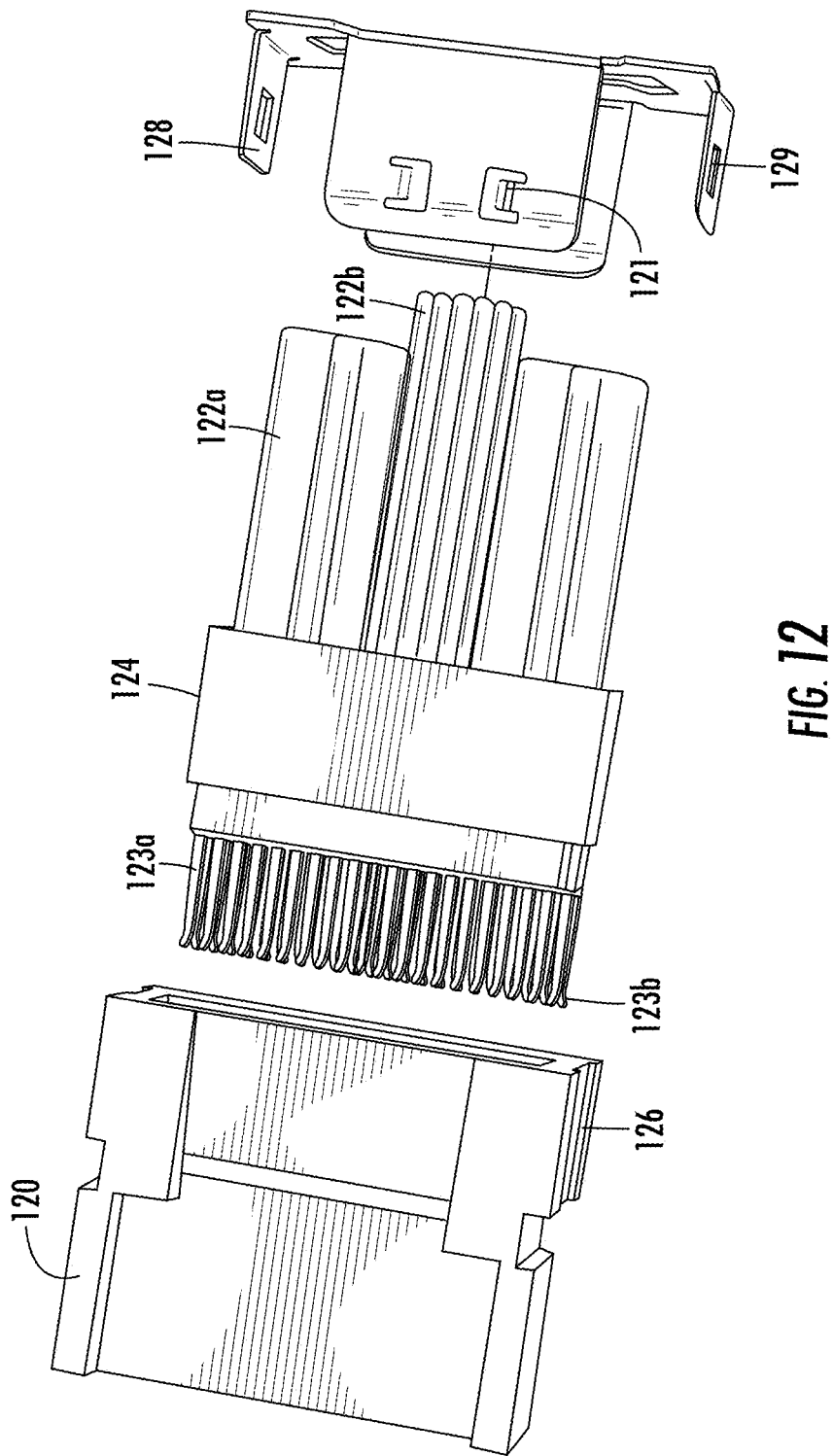
FIG. 12 is a top exploded view of a receptacle connector.
Figure 13:
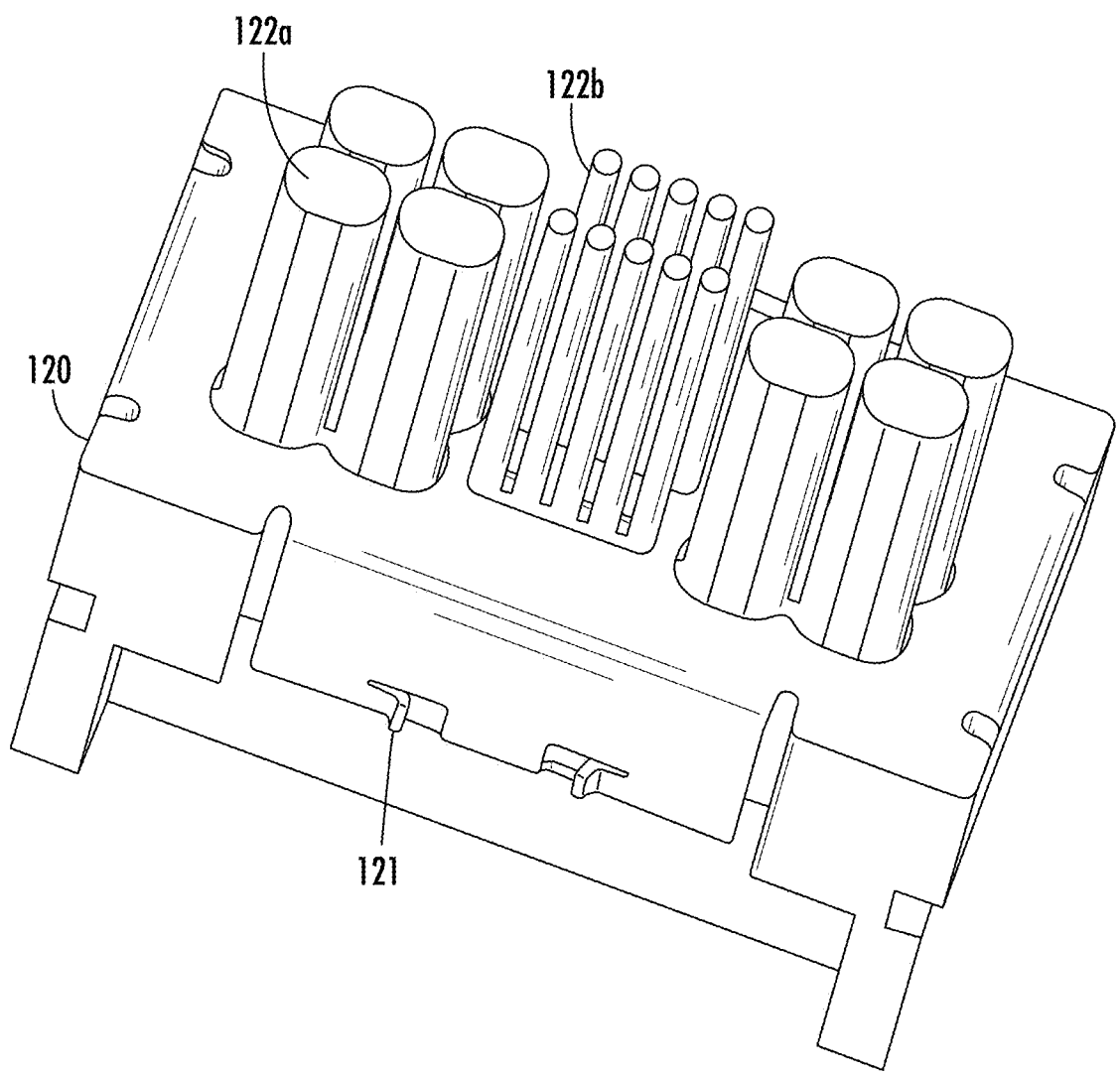
FIG. 13 is a rear perspective view of the receptacle connector.

FIG. 10 shows a receptacle connector 120 being plugged into the rear of the cage 116. FIGS. 11-13 show the receptacle connector 120. The receptacle includes a clip 128, a lead frame 124, and a housing 125. The housing 120 can be made of any suitable electrically insulating material, such as molded plastic. The lead frame 124 is inserted into the housing 120 and is kept in place with the clip 128. The lead frame 124 includes an overmold over the cables 122 and the contacts 123a, 123b. The upper contacts 123a mate with electrical lands on the top of the edge card 134 of the transceiver 130, and the lower contacts 123b mate with electrical lands on the bottom of the edge card 134 of the transceiver 130. Any number of contacts 123a, 123b can be used. It is also possible to only use the upper contacts 123a or the lower contacts 123b.

The clip 128 includes latches 121. When the receptacle connector 120 is inserted into the cage 116, the latches 121 engage with latch slots 103 in the cage 116. Although FIG. 11 shows two latches 121 on top and two latches 121 on bottom, any number and any location of latches 121 can be used. The clip 128 can also include openings 129 that engage with bosses 126 on the housing 125 when the clip 128 is connected to the housing 125. The clip 128 can be made of stamped and formed sheet metal. The clip 121 can include one or more openings for the cables 122.

As shown in FIG. 13, the cables 122 can include high-speed cables 122a and low-speed cables 122b. Any number of high-speed 122a and low-speed cables 122b can be used. The high speed cables 122a can transmit, for example, high-bandwidth signals in excess of 10 Gbps and can include, for example, twinax, coax, triax, or some other suitable electrical transmission line. In some applications, high speed is at least 25 Gbits/sec data transmission speed, and low speed is less than 25 Gbits/sec data transmission speed. Low-speed cables 122b can transmit, for example, control signals and power and can include, for example, an insulated wire without a ground shield. One end of the cables 122a, 122b can be terminated to a corresponding contact 123a, 123b, the other end of the cables can be terminated to the PCB. If the cables 122a are twinax, then the two center conductors of the twinax can be terminated to adjacent signal contacts and the shield can be connected to a ground contact(s).

Figure 14:
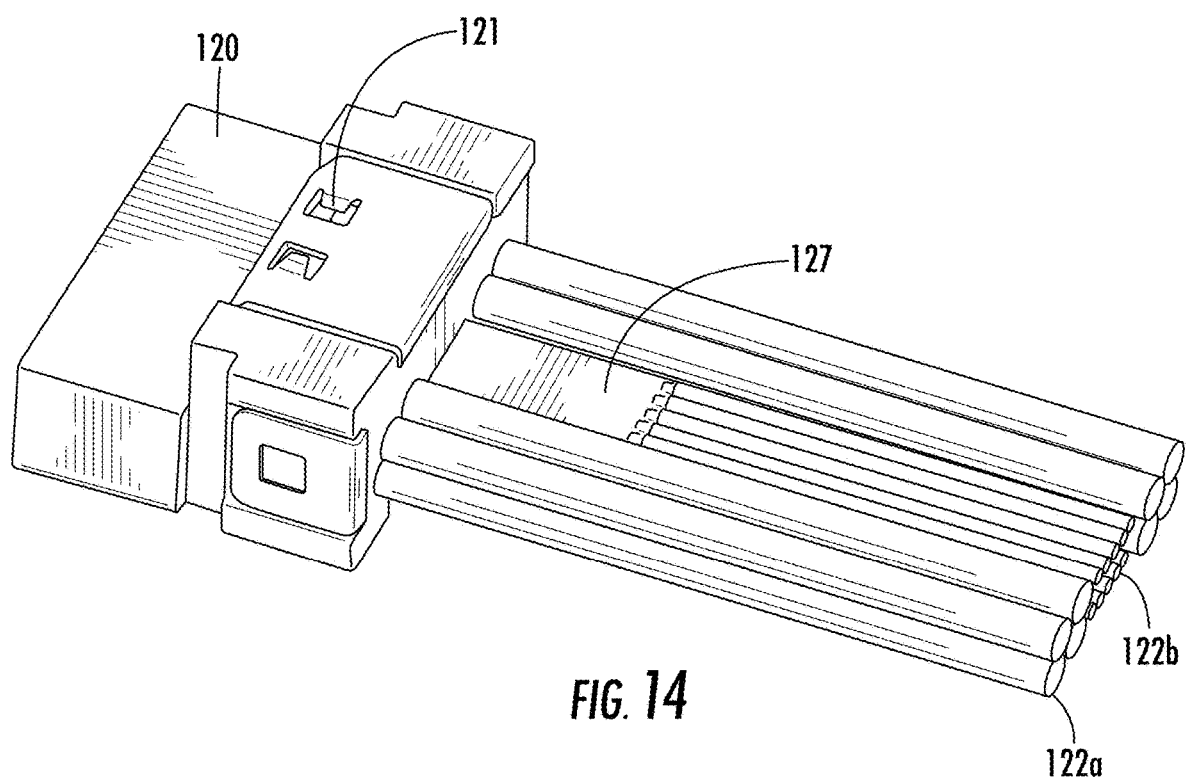
FIG. 14 is a rear perspective view of an alternative receptacle connector.

FIG. 14 shows an alternative receptacle connector 120 that includes a PCB assembly (PCBA) 127. PCBA 127 can include electrical components that provide signal and/or power conditioning and/or filtering. PCBA 127 can improve the performance and simplify the design of the transceiver 130 because the power and control signals will have less electrical noise.

Figure 15:
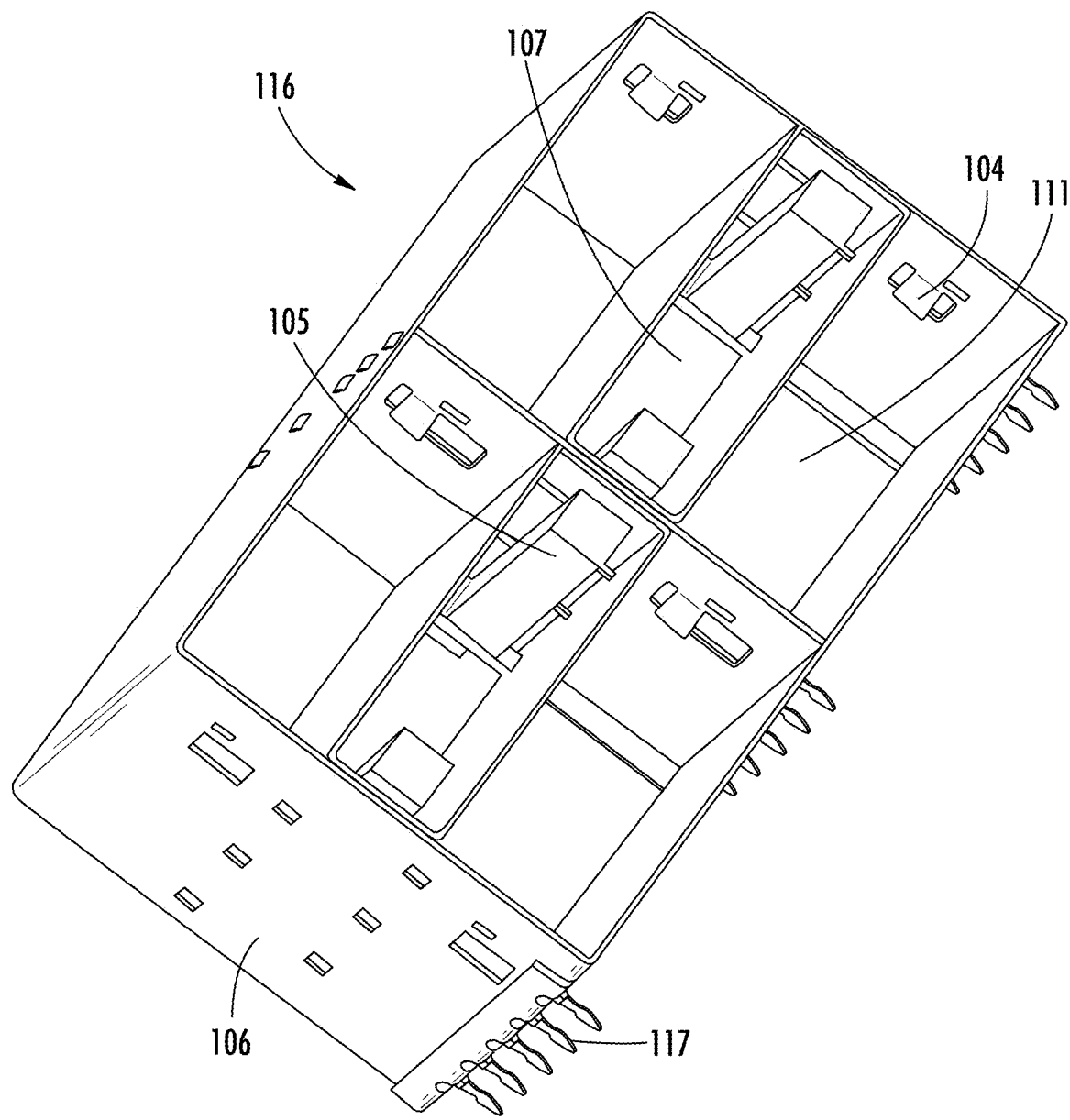
FIG. 15 is a front perspective view of a cage according to a preferred embodiment of the present invention.
Figure 19:
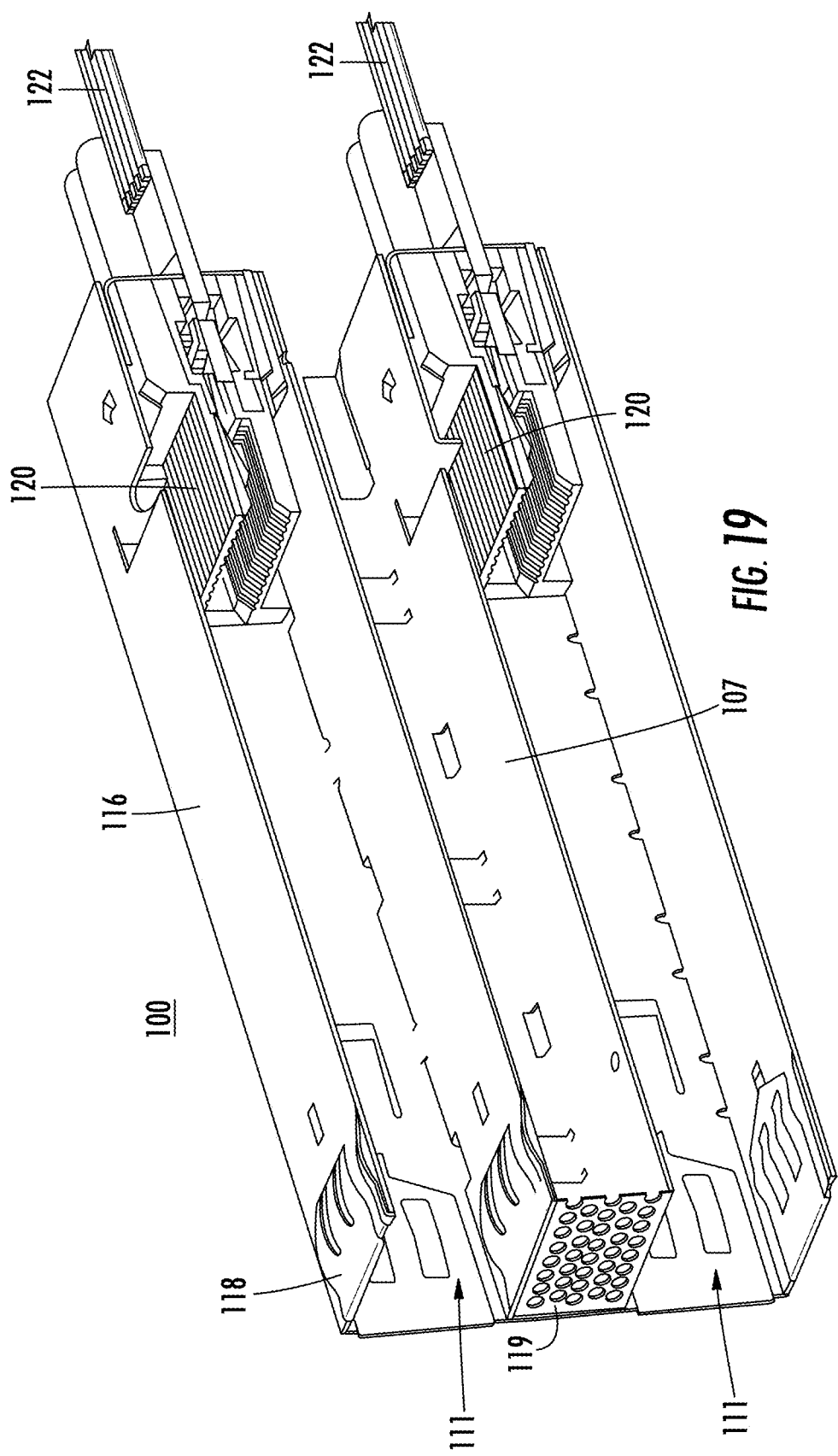
FIG. 19 is perspective sectional view of the receptacle.
Figure 20:
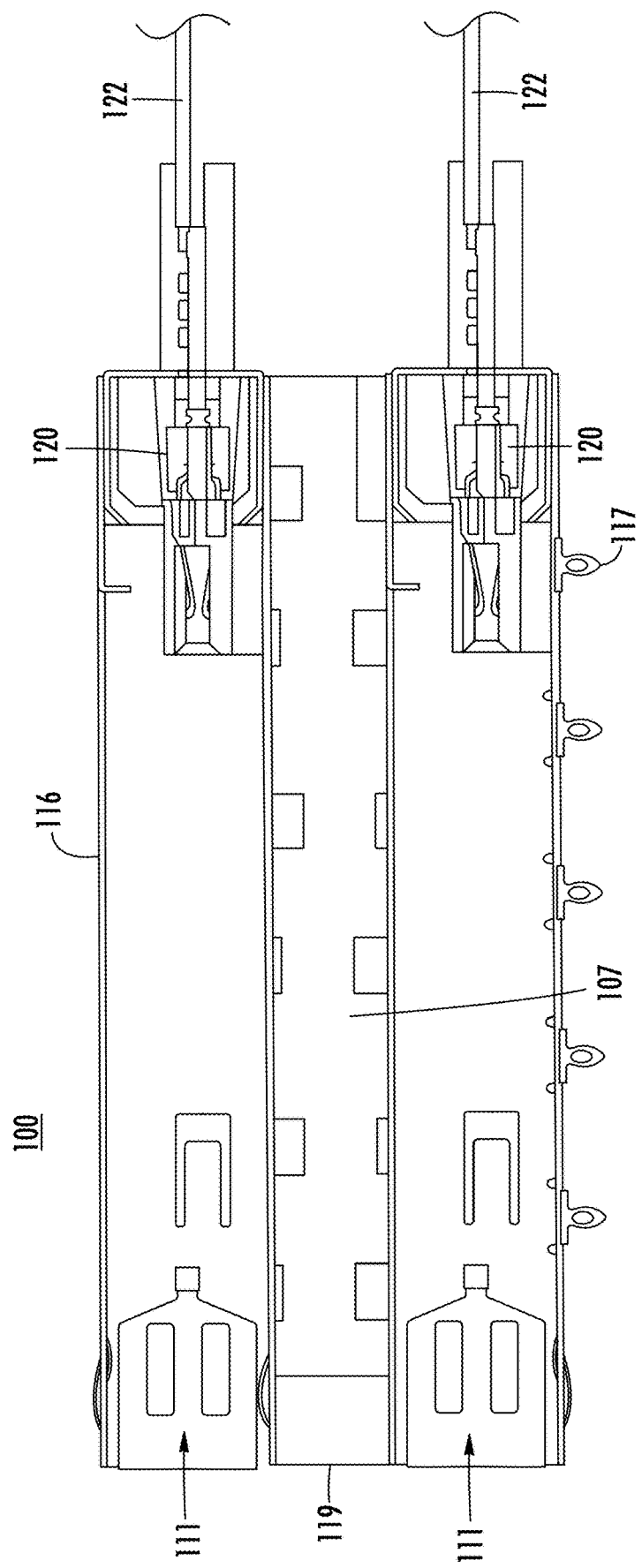
FIG. 20 is a side sectional view of the receptacle shown in FIG. 19.
Figure 21:
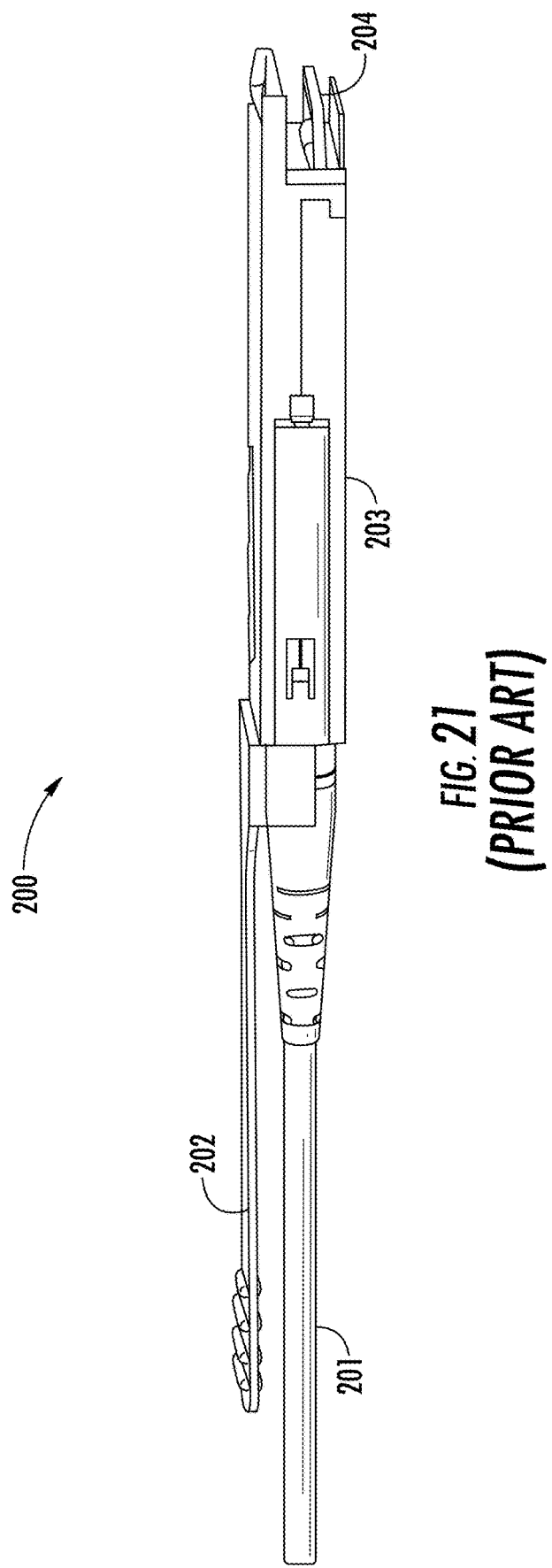
FIG. 21 shows a prior art active cable.
Figure 22:
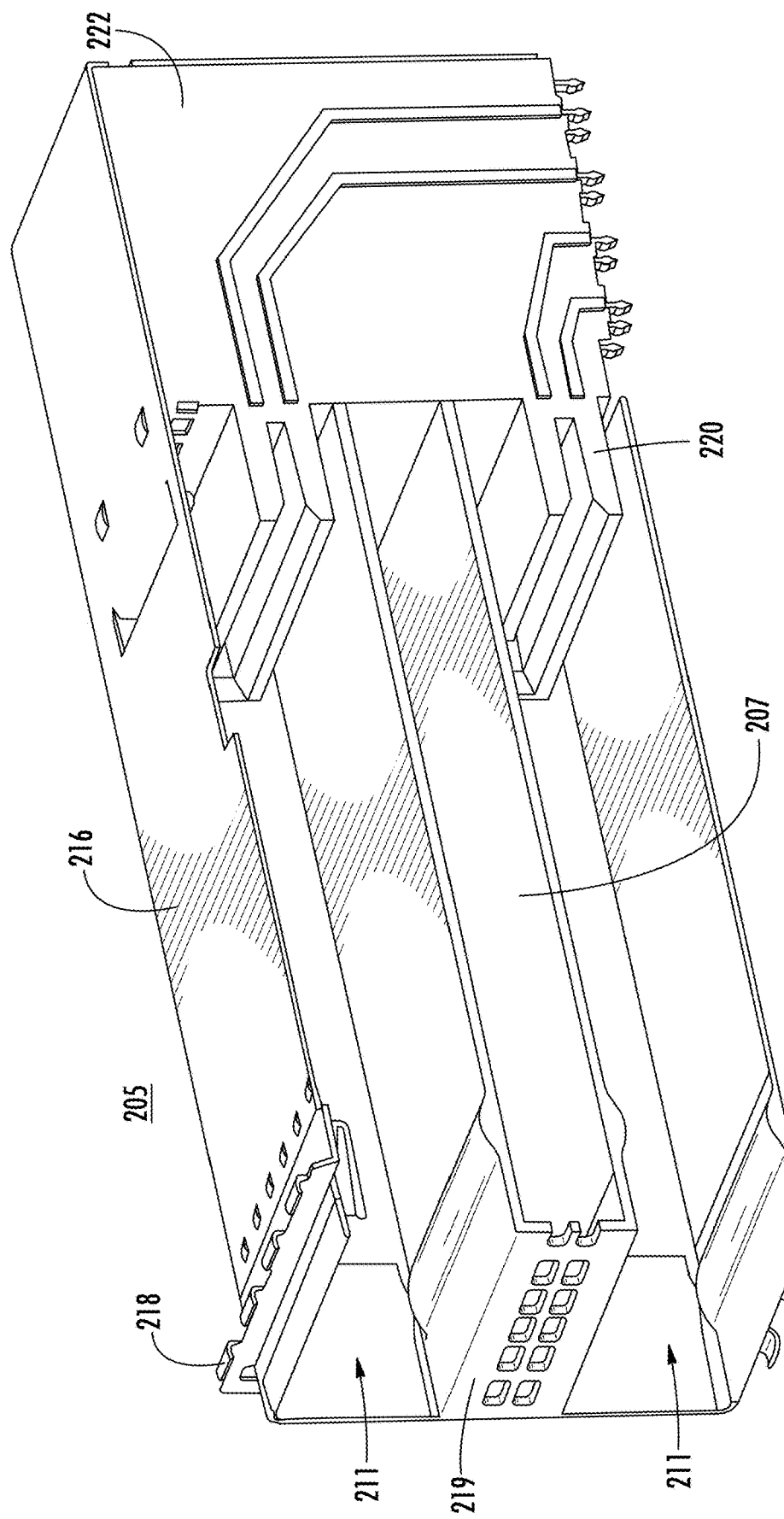
FIG. 22 is perspective sectional view of a known receptacle.
Figure 23:
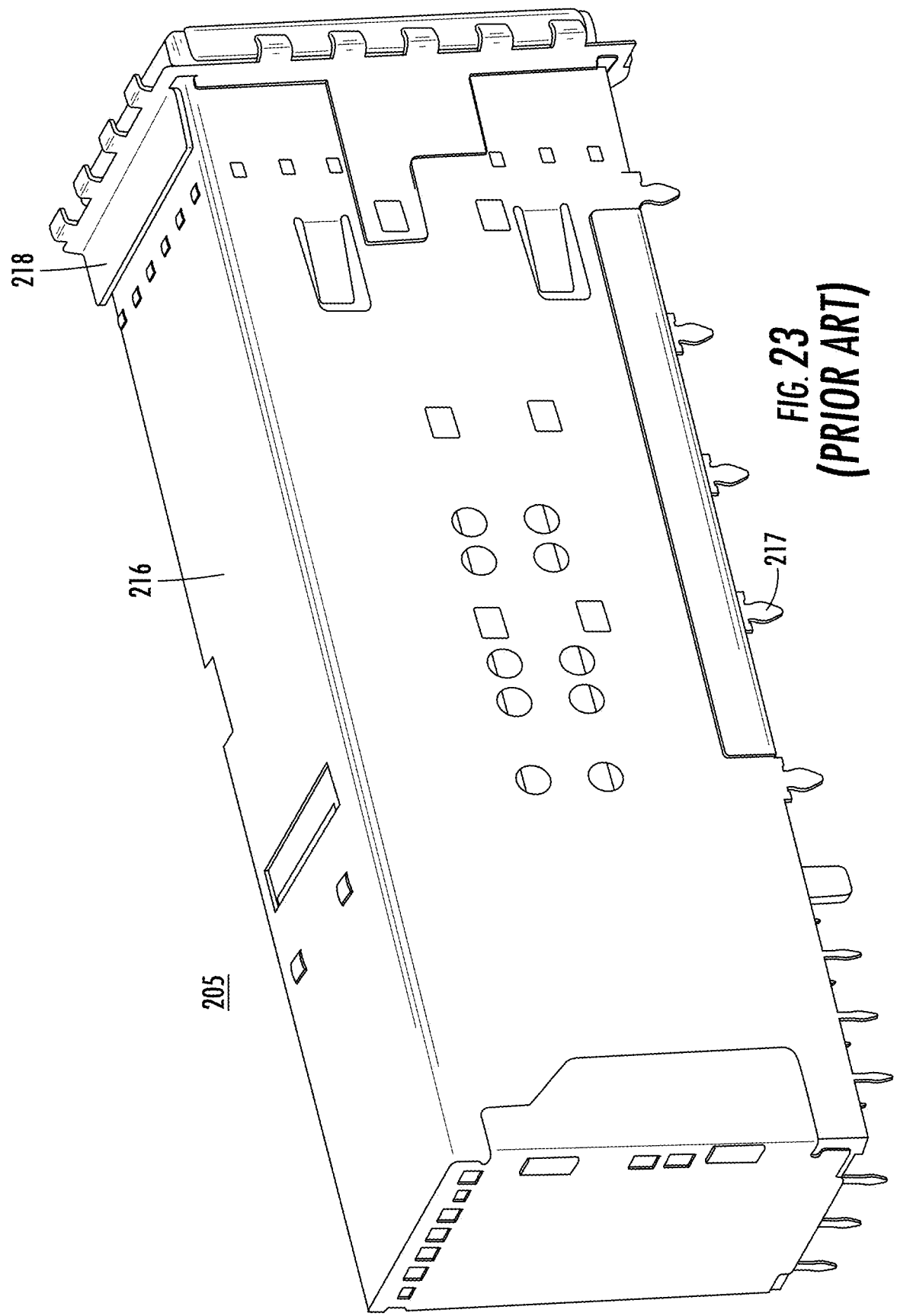
FIG. 23 is rear perspective view of the known receptacle shown in FIG. 22.
Figure 24:
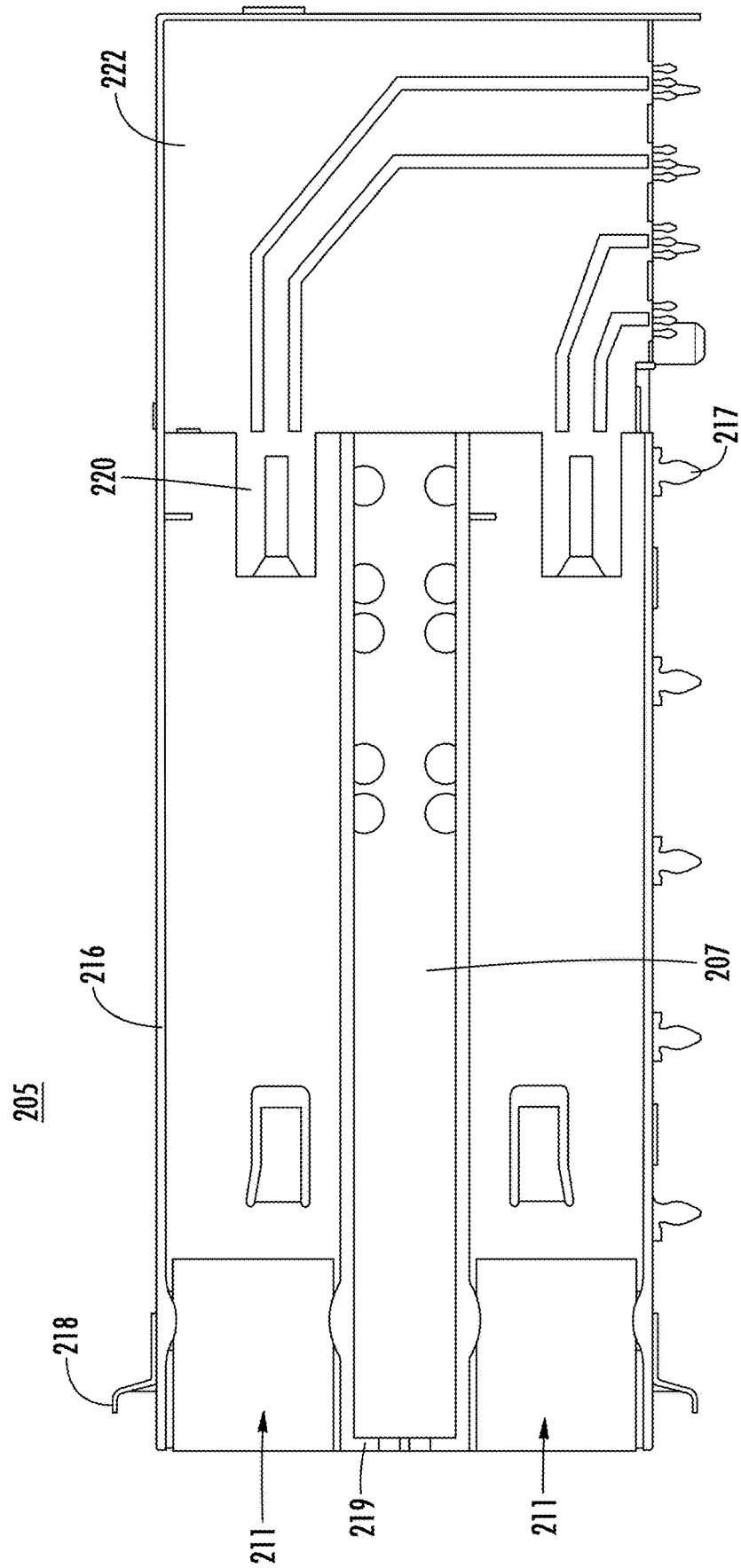
FIG. 24 is a side sectional view of the known receptacle shown in FIG. 22.

FIGS. 15, 19, and 20 show the cage 116. The cage 116 can include mounting pins 117 that can be used to mount the cage 116 to a PCB (a PCB is not shown in FIG. 15). The mounting pins 117 can be "eye-of-the-needle" type suitable for press-fit mounting. The receptacle connectors 120 do not need to have any mounting pins, including, for example, press-fit pins, through-hole pins, surface-mount pins, etc., to mount the receptacle connector 120 to the PCB. The cage 116 includes walls 106 that define slots 111. Although four slots 111 in a 2×2 array are shown in FIG. 15, the cage 116 can include any number of slots 111 in any arrangement. For example, the cage 116 can have two slots arranged in 1×2 array (horizontally spaced along a substrate) or in a 2×1 array (vertically stacked with respect to a substrate). The walls 106 can include latches 104 that engage the transceiver 130 when the transceiver 130 is mated with the receptacle 100. Similar to springs 14a, 14b in FIGS. 4-6, each slot 111 could include one or more springs to press the transceiver 130 toward the passage 107 to ensure robust physical contact between the transceiver 130 and the passage 107. The cage 116 can be made in any suitable manner, including being made of stamped and formed metal.

As shown in FIG. 19, the cage 116 also includes a passage 107 that provides an air-flow path. The passage 107 allows air to flow between the front of the receptacle 100 (where the transceivers 130 can be plugged in) and the rear of the receptacle 100 (where the receptacle connectors 120 are plugged in). When transceivers 130 are plugged into the top and bottom slots 111 in the receptacle, air can flow between the top and bottom transceivers 130 and from front to back (or back to front) of the receptacle, cooling the heat-producing transceivers 130. The front of the passage 107 can include a faceplate 119 (faceplate 119 is not shown in FIG. 15 but is shown in FIGS. 19 and 20), and the rear of the passage 107 can be uncovered. By not using wafers, the receptacle connectors 120 can be arranged to not block or to minimize impeding the air flow completely through both opposed ends of the passage 107 such that air passes fluidly through the faceplate 119, through the passage 107, and between the receptacle connectors 120. The cables 122 can be arranged to not block or impede air flow. In addition to not blocking air flow, the cables 122 provide better signal integrity than that the wafers 222 used in the known receptacle 205. Thus, an air-flow path from the front to the back (or from the back to the front as described above) of the receptacle 100 can be provided.

Figure 25:
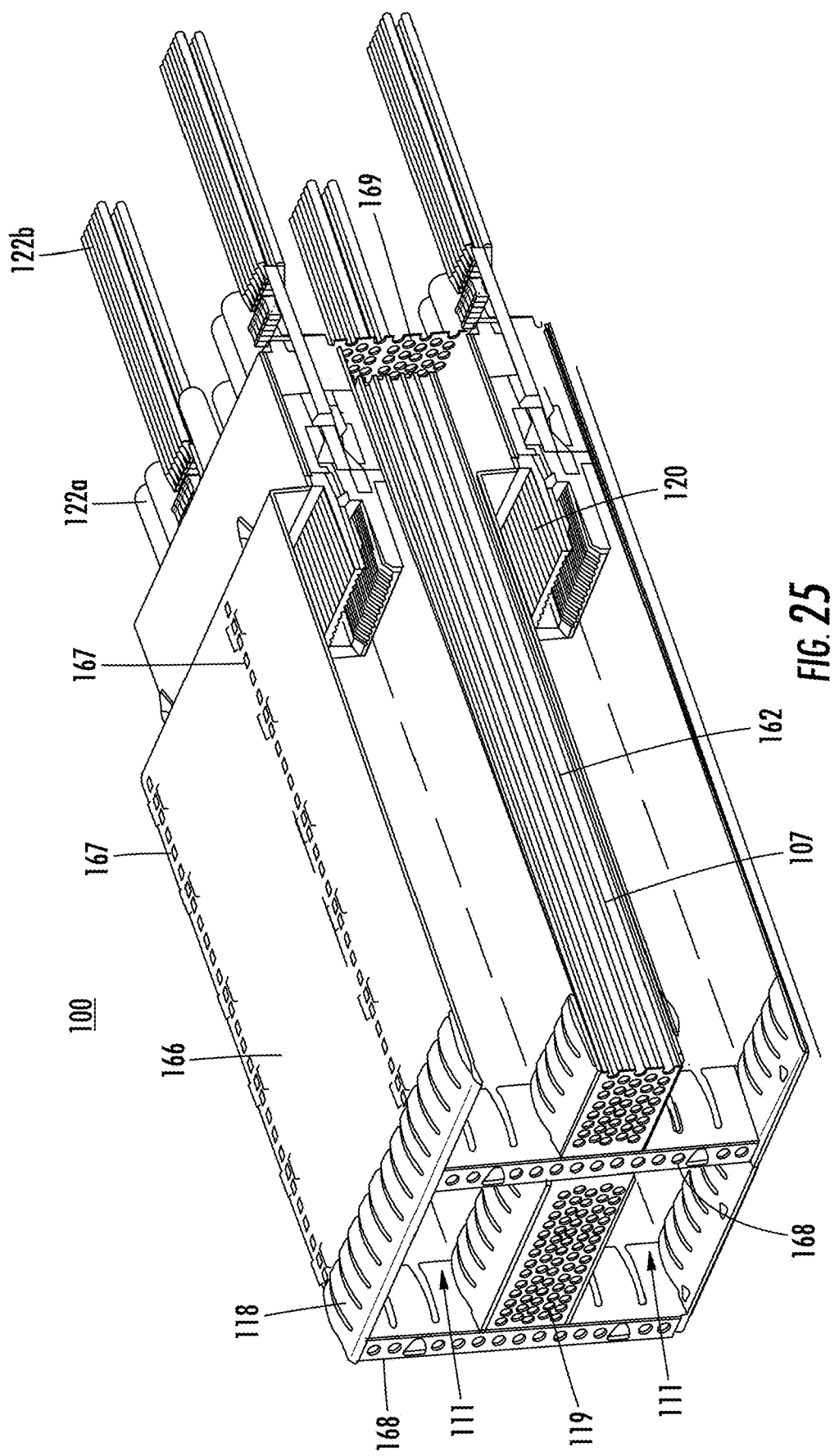
FIG. 25 is a perspective sectional view of a receptacle with a heatsink.
Figure 26:
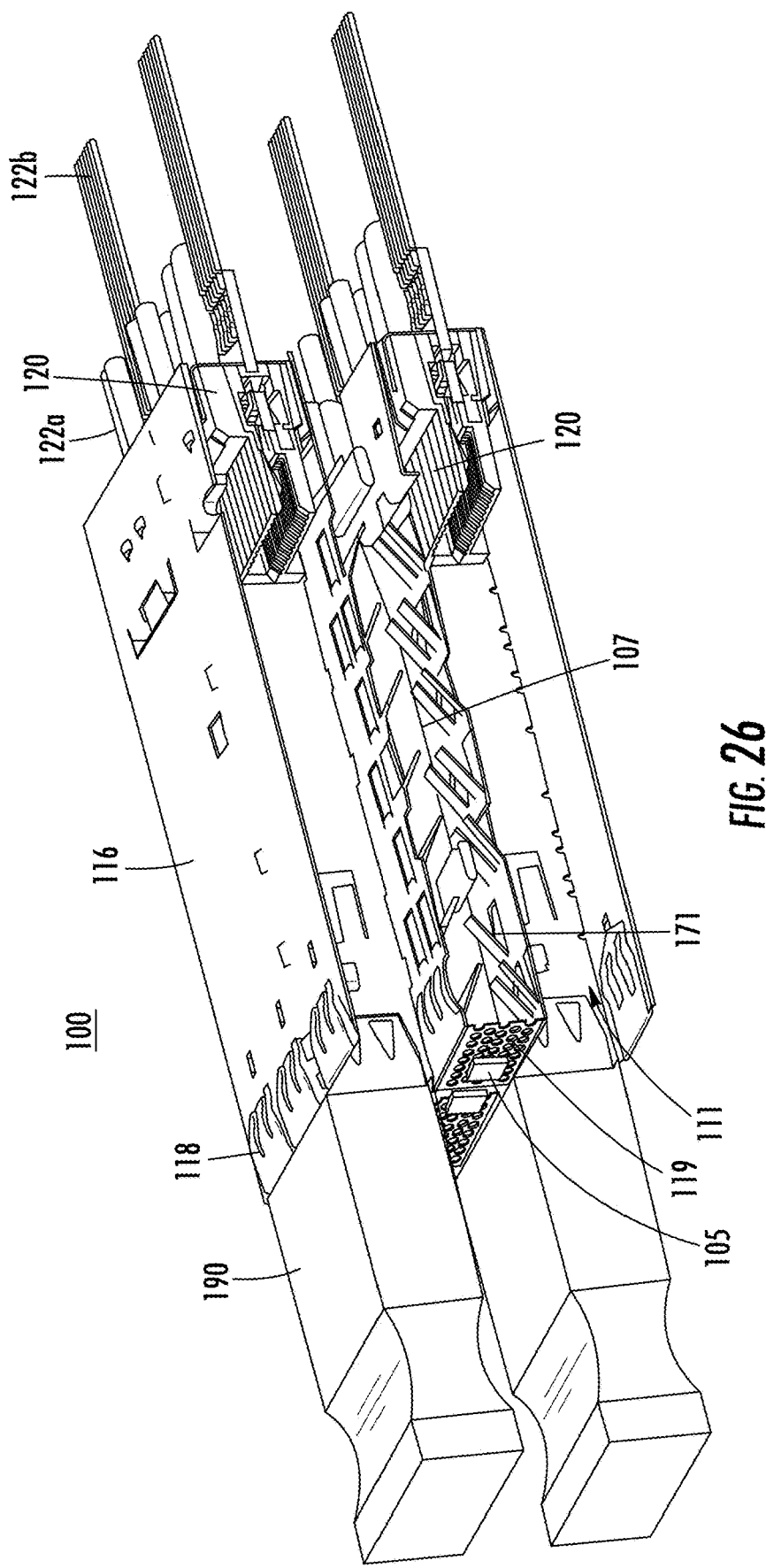
FIGS. 26-29 are perspective views of a receptacle with a double-walled cage.

Instead of having an open passage 107 as shown in FIGS. 15, 19, and 20, the passage 107 could include heat-transferring fins similar to the fins 171 shown in FIG. 26 that extend from the wall adjacent to the transceiver 130 into the interior of the passage 107 or could include a heat sink such as heat sink 162 shown in FIG. 25. The hexagonal pattern of such can provide multiple air paths from the front to the back of the receptacle 100. The webbing could have a constant thickness or could have a variable thickness. For example, the webbing could be thicker at the top and bottom and thinner near the middle.

The cage 116 can include a light pipe 105 in the passage 107. As shown in FIG. 15, each passage 107 can include two light pipes 105. The light pipes 105 can transmit light from an LED on a PCB to the front of the receptacle 100. The cross-sectional area of the light pipes 105 is preferably less than 15% of the total cross-sectional area of the passage 107. For example, a passage 107 can have a cross-sectional area of 450 mm$^2$, and the light pipes 105 can have a cross-sectional area of 25 mm$^2$. If there are two light pipes 105 per passage 107, then the total cross-section of the two light pipes is 50 mm$^2$, which is about 11% of the total cross-sectional area of the passage 107.

The cage 116 of FIG. 15 can be used with the stacked configurations shown in FIGS. 5B and 5C. If the receptacle connectors 120 include cables 122, then the cage 116 can be used in the stacked configuration shown in FIG. 5C. If the bottom receptacle connector 120 provides direct electrical paths to the PCB, then the cage 116 can be used in the stacked configuration shown in FIG. 5B. Other configurations are also possible. For example, if the bottom receptacle connectors 120 includes cables 122 and direct electrical paths to the PCB, then the cage 116 can used in a stacked configuration that is a combination of FIGS. 5B and 5C.

FIG. 25 shows receptacle 100 with a cage 166. Cage 166 is similar to cage 116 but includes a heat sink 162 in the passage 107 and is double walled. The heat sink 162 extends along the passage 107. The front opening of the passage 107 can be covered by faceplate 119, and the rear opening of the passage can be covered by faceplate 169. It is not necessary to use faceplates 119, 169 separate from the heat sink 162. It possible that the faceplates 119, 169 are part of the heat sink 162. The heat sink 162 can be similar to the heat sink 12 shown in FIG. 3 with, for example, hexagonal webbing. Other webbing patterns are also possible. The heat sink 162 defines air flow paths between the front and rear of the passage 107.

The cage 166 includes four slots 111 arranged in a 2×2 array. Other numbers and arrangements of slots 111 can also be used. The two columns of slots 111 are separated by an interior double wall defining a passage between the columns of slots 111. The opening of the passage between the interior double walls is covered by faceplate 168 with holes. The faceplate plate 168 can be separate from faceplate 119 or can be connected to faceplate 119 as a single unitary body. The size and shape of the holes in faceplate 168 can be the same or can be different from the holes in faceplate 119. Holes 167 are arranged in the top of the cage 166 along the passage between the interior double walls. The size and shape of holes 167 can be the same as or can be different from the size and shape of the holes in the faceplate 168.

As shown in FIG. 25, the exterior walls of the cage 166 can be a double wall. Only one exterior double wall is shown in FIG. 25 because FIG. 25 is a sectional view. As with the interior double wall, the exterior double walls can be covered by a faceplate 168 with holes and can include holes 167 along the top of the cage 166. Holes in faceplate 168 can be fluidly connected to a cavity between adjacent slots 111. The cavity can extend from the faceplate 168, through the cage 166, and to the optional rear faceplate 169. Alternatively, or in addition, holes in faceplate 168 can be fluidly connected to holes 167. The exterior double walls can include holes 167 (not shown in FIG. 35 but shown in FIG. 27) adjacent to passages 107 to provide air flow through the exterior double walls and at the bottom of the exterior double wall to provide air flow at the bottom of the of exterior double wall. The interior double walls can include similarly arranged holes. Although not shown in FIG. 25, it is possible to add top and bottom exterior double walls to cage 166 so that each slot 111 has passages on four sides.

FIG. 26 shows receptacle 100 with cage 116. Cage 116 in FIG. 26 includes fins 171 extending into the passage 107. Fins 171 can help in transferring heat from transceivers in the slots 111 to the passage 107. Any number, size, and shape of fins 171 can be used. The faceplate 119 in FIG. 26 includes a hole through which the light pipe 105 extends. The end of the light pipe 105 can be flush or substantially flush with the front of the receptacle 100.

Figure 27:
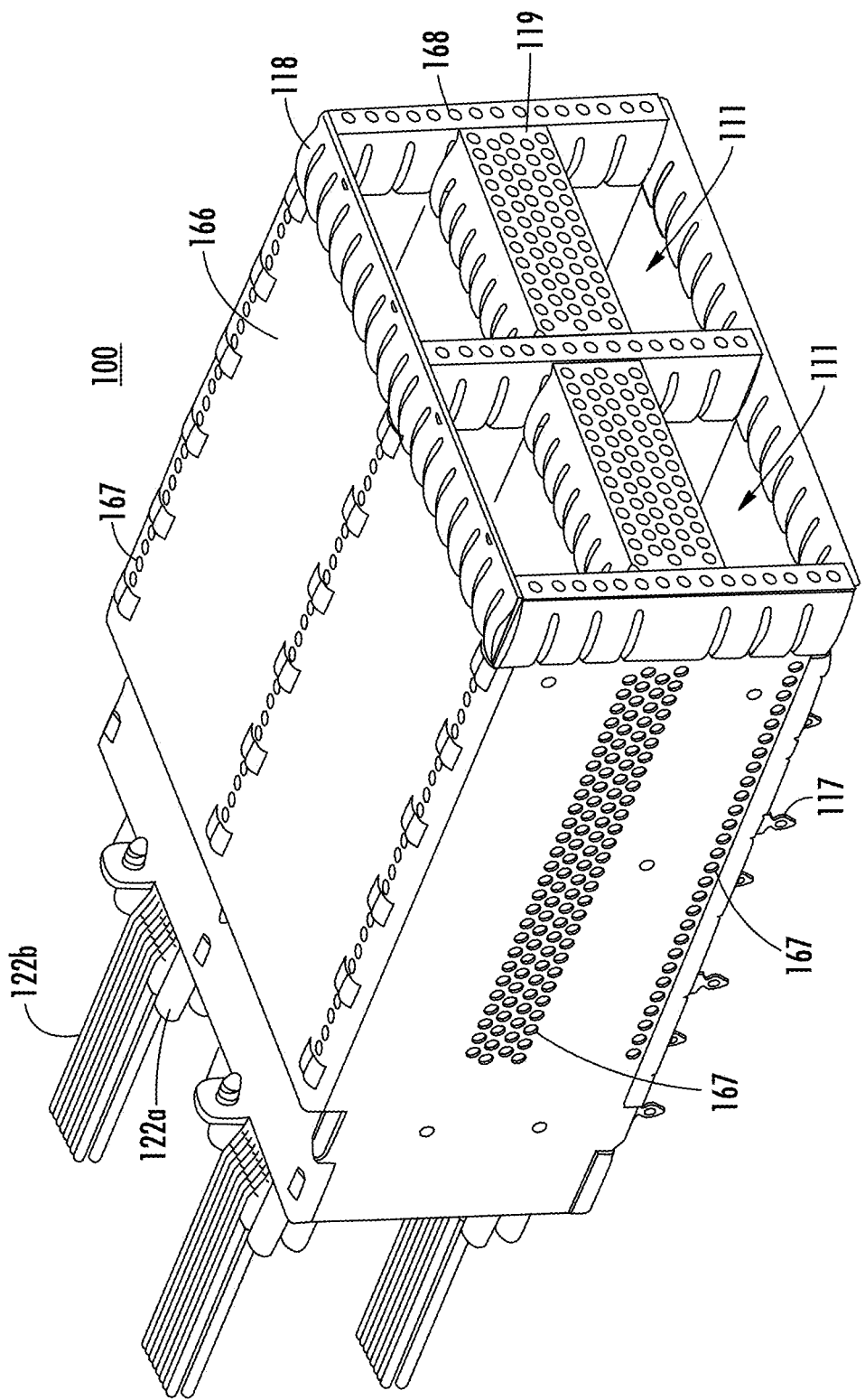
Figure 28:
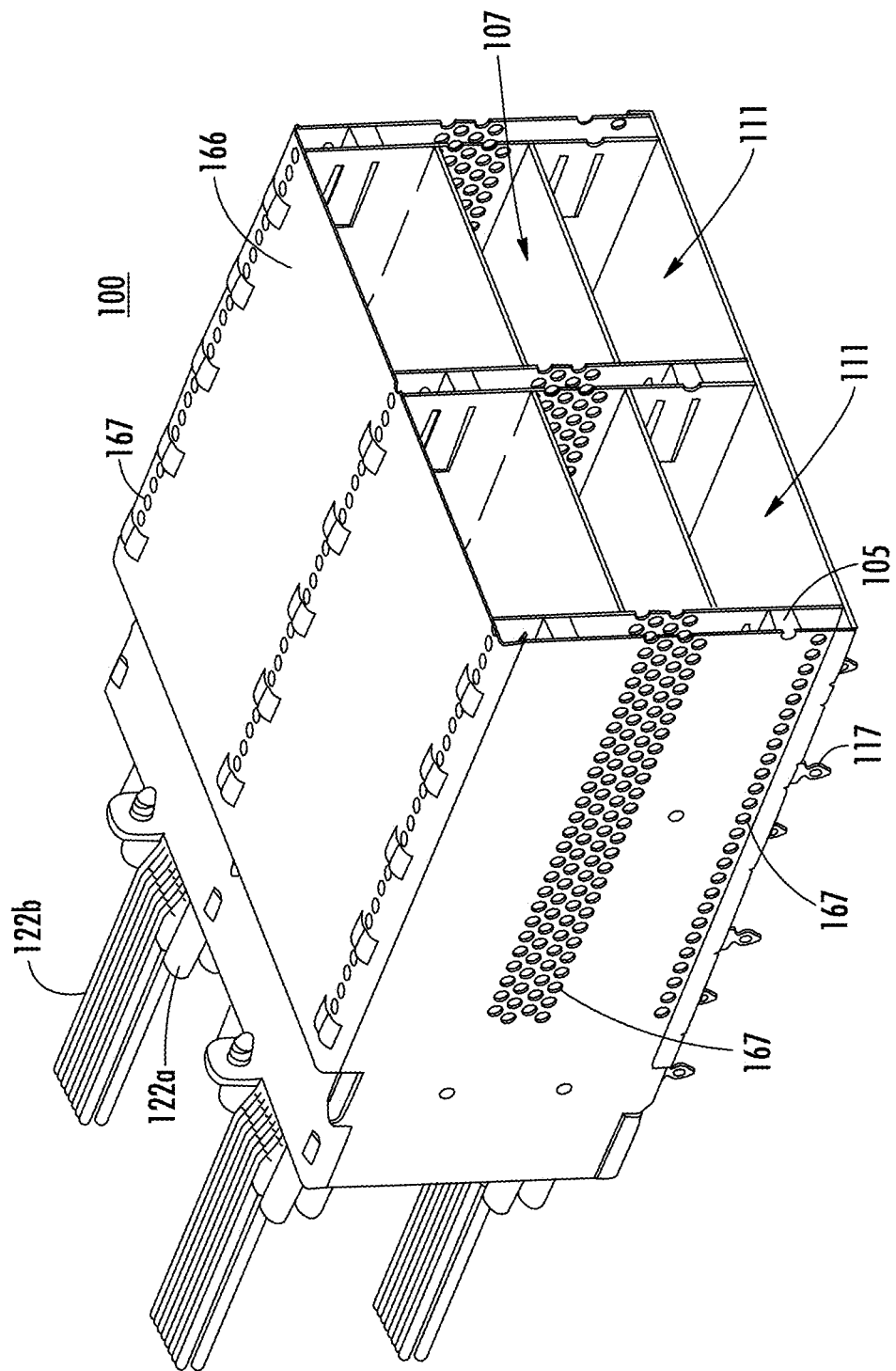
Figure 29:
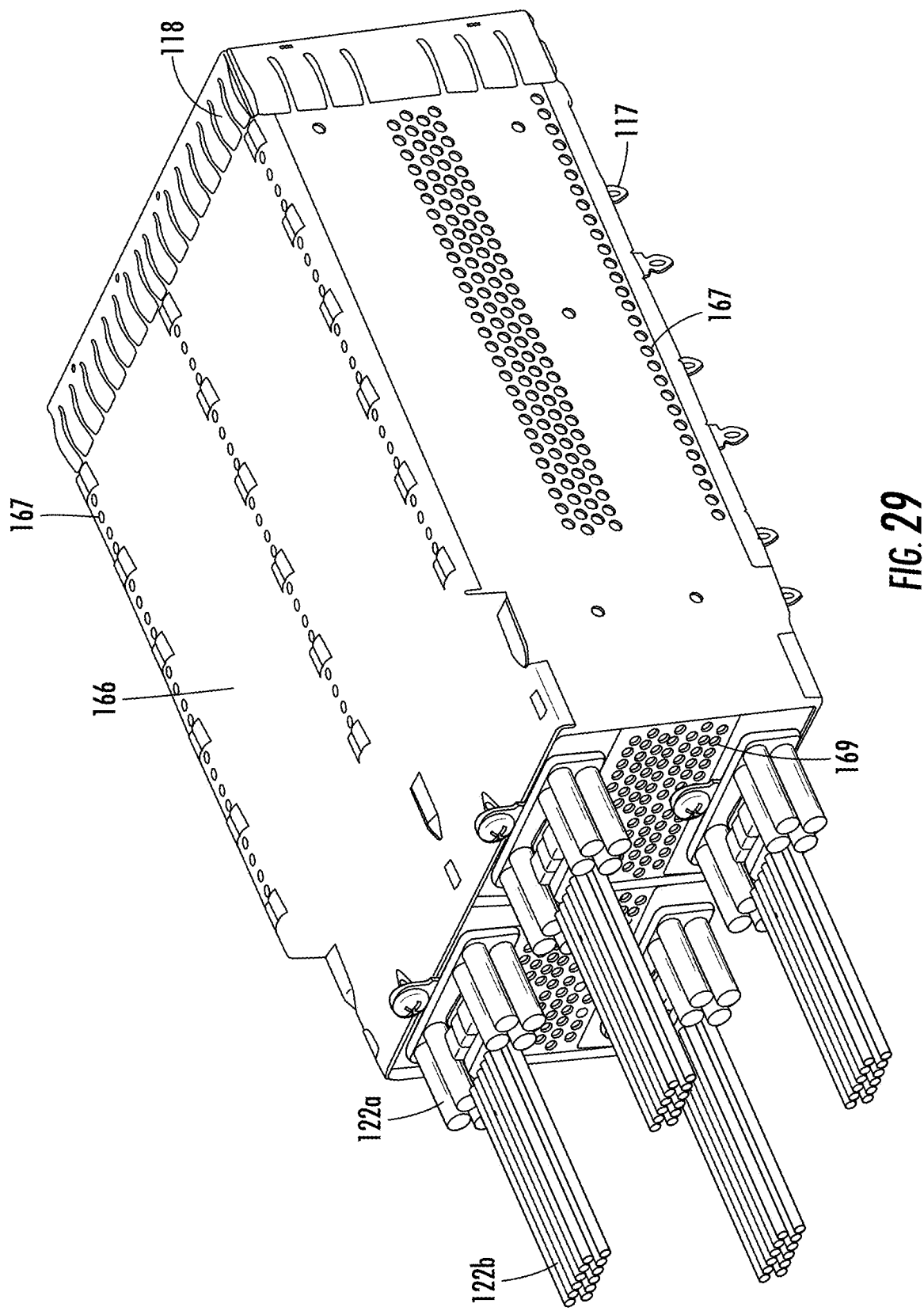

FIGS. 27-29 show receptacle 100 with cage 166. Cage 166 in FIGS. 27-29 is similar to cage 166 shown in FIG. 25 but without the heat sink 162. In FIG. 27, the cage 166 includes faceplates 119, 168, and in FIG. 28, the cage 166 is without faceplates 119, 168. FIG. 28 shows light pipes 105 in the interior and exterior double walls. Although FIG. 28 shows four light pipes 105 (two in one exterior double wall and two in the interior double wall), any number and any arrangement of light pipes 105 can be used. The cage 166 includes two exterior double walls and one interior double wall. Cage 166 can include double walls that extend across the top and bottom of the cage 166. A different arrangement of double walls could be used with a different array of slots 111. For example, a 2×3 array of slots 112 could include two interior double walls and two exterior double walls. As shown in FIG. 28, the double walls, both interior and exterior, can include holes 167 adjacent to passage 107. The double walls can also include holes 167 near the bottom of the double walls. The top of the cage 166 can also include holes 167 over the passages defined by the double walls. Although not shown in FIG. 28, the passage 107 could also include fins similar to fins 171 in FIG. 26.

FIG. 29 shows two rear faceplates 169. Any number and any arrangement of faceplates 169 can be used depending on the arrangement of the slots 111. The size and shape of the holes can be the same as or can be different from the size and shape of the holes in the faceplates 119, 168.

Figure 17:
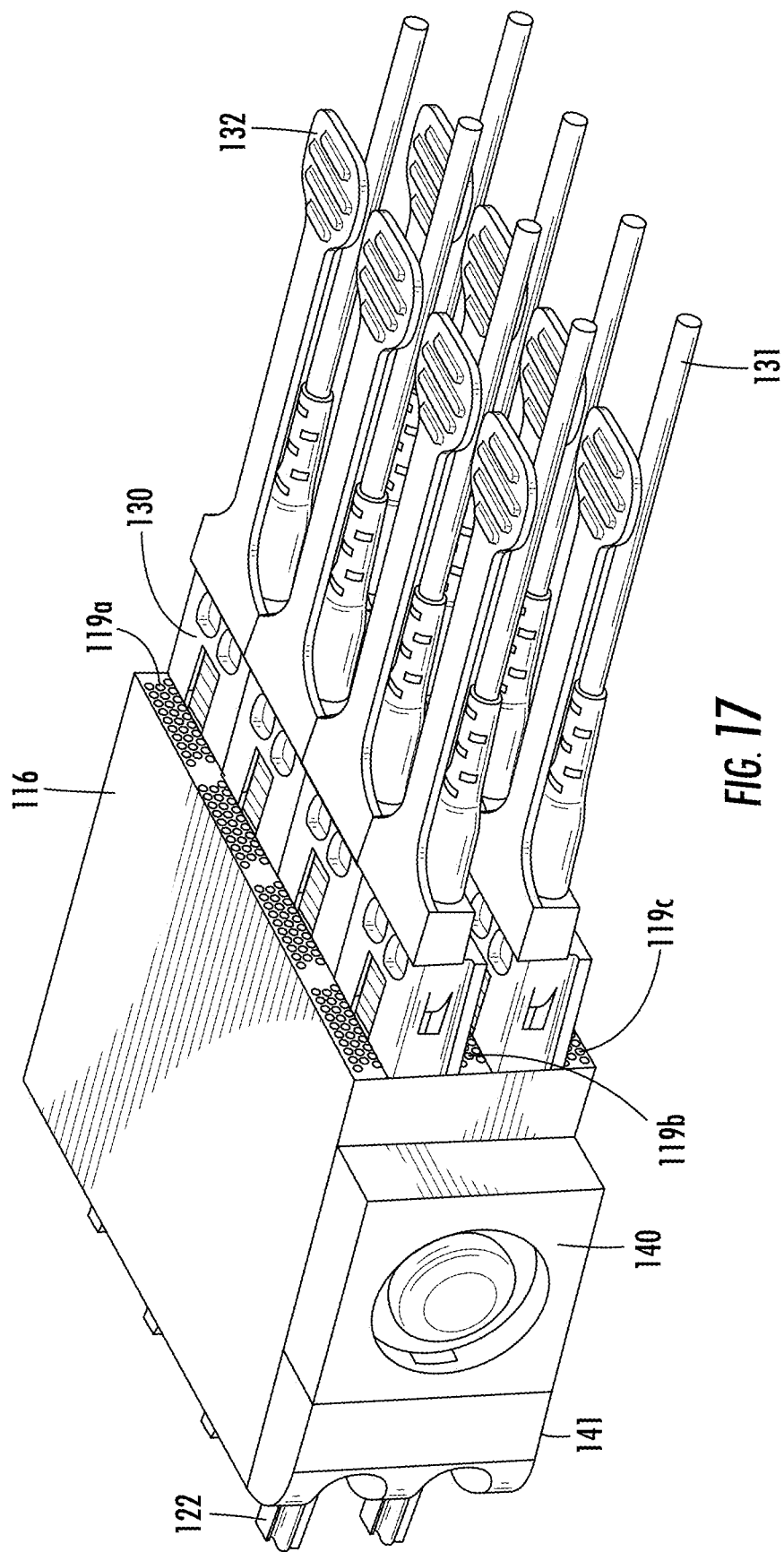
FIG. 17 is a perspective view of a receptacle with a blower according to a preferred embodiment of the present invention.
Figure 18:
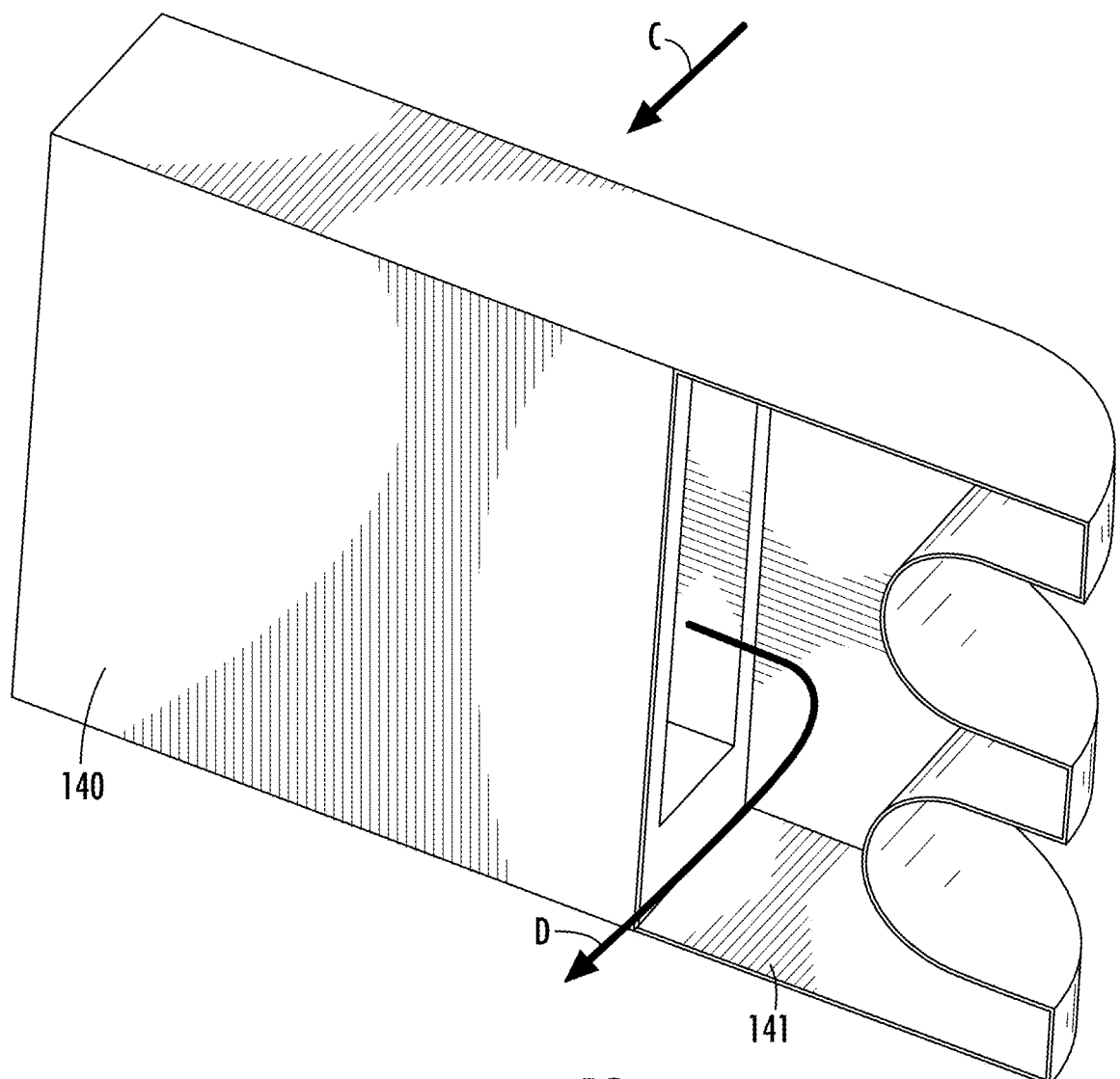
FIG. 18 is a perspective view of the blower shown in FIG. 17.

Air can be forced through passage 107 to increase the cooling of the transceivers 130. If the receptacle 100 is included on a rack mount in an electronics rack, then a fan mounted on the rack mount or in the electronics rack can force air through the passage 107. It is also possible, that as shown in FIG. 17, the receptacle 100 includes a blower 140 attached to the cage 116. FIG. 18 shows the blower 140. The blower 140 includes a guide 141 to direct the blown air. As shown in FIG. 18, the blower 140 can receive air in direction C and blow the air out in direction D through guide 141 into holes in the outer wall of the cage 116. Each of the three fingers of the guide 141 can direct air into one of the passages 107 connected to the top, middle, and bottom faceplates 119*a*, 119*b*, 119*c*. In this manner, blower 140 can blow ambient air through the passages 107 and over the transceivers 130. The blower 140 can also blow air in the opposite direction, from within the receptacle 100 to the outside ambient air. The blower 140 can also be used, possibly with ducting, if there is a heat sink in the passage 107. Any suitable blower can be used. The blower 140 could be a 30-mm diameter fan with rotating blades, a piezoelectric actuated fan, a corona (ion) fan, etc. Instead of being mounted to the exterior of the cage 116, the blower 140 could be mounted within one or more of the passages 107.

In addition to blower 140, FIG. 17 also shows other possible arrangements of the receptacle 100. For example, the slots 111 can be arranged in a 2×4 array so that the receptacle can receive eight total transceivers 130. Instead of a single faceplate 119, the receptacle 100 can include a top faceplate 119*a*, a middle faceplate 119*b*, and a bottom faceplate 119*c*. Each faceplate 119*a*, 119*b*, and 119*c* covers a separate passage that allows air to flow from front to back (or back to front) of the receptacle 100. This arrangement is similar to the stacked arrangement shown in FIG. 5A but with an additional heat sink located between the PCB 50 and the lower transceiver 30*b* and lower connector 20*b*. In such an arrangement, the lower connector 20*b* would include cables 22*b* to provide electrical paths from the lower connector 20*b* and the PCB 50.

If the cages 116 shown in FIGS. 8 and 17 are the same height, then the slots 111 in FIG. 17 are closer together than the slots 111 in FIG. 8.

The cage can include a liquid-filled heat pipe that facilitates heat transfer away from transceiver mated with the cage. The heat pipe can be used to spread the heat from localized heat sources, such as the optical engine of the transceiver 130. For example, the heat spreader 13 shown in FIG. 7 can include a heat pipe to facilitate heat transfer between a transceiver in the slot 11 and the heat sink 12. The heat pipe allows the thickness of the heat spreader to be reduced, reducing weight and increasing the available area for the heat sink.

Figure 16:
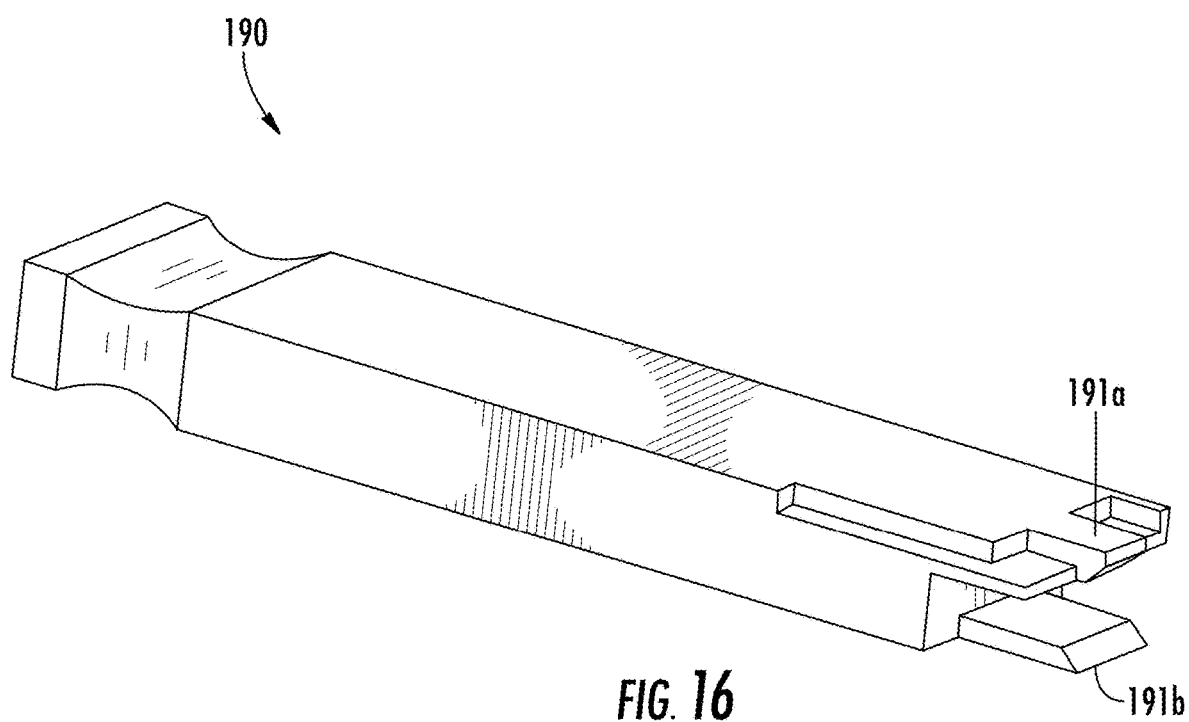
FIG. 16 is a perspective view of a tool according to a preferred embodiment of the present invention.

FIG. 16 shows a receptacle-connector removal tool 190. To remove a receptacle connector 120, the receptacle-connector removal tool 190 is inserted into a slot 111 from the front side of the cage 116 as shown, for example, in FIG. 26. Upper beveled surface 191*a* and lower beveled surface 191*b* elastically deform the clip 128 so that latches 121 disengage from the latch slots 103. Continuing to push receptacle-connector removal tool 190 into slot 111 will push the receptacle connector 120 out of the back the cage 116. The ability to rework or replace a receptacle connector 120 with a simple tool provides flexibility and ease in system maintenance and debugging. No desoldering of any connection is required to remove receptacle connector 120, and thus there is little chance of inadvertent damage during the removal operation.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A cage assembly comprising:
   a cage including:
      a first end and a second end opposed to the first end, the first and the second ends define a transceiver-mating direction; and
      an upper transceiver opening and a lower transceiver opening that are each located at the first end and each configured to receive a mating transceiver; and
   upper and lower receptacle connectors that are located at the second end, that are vertically stacked in a direction that is orthogonal or substantially orthogonal to the transceiver-mating direction, and that are each configured to receive a card-edge of a mating transceiver; wherein
   the lower receptacle connector is a PCB-mounted connector; and
   the upper receptacle connector is a cable connector that includes cables that each include a grounded shield.

2. The cage assembly of claim 1, wherein the cage defines a passageway that extends between the first and the second ends and that is positioned between the upper and the lower receptacle connectors.

3. The cage assembly of claim 2, wherein the upper and the lower receptacle connectors each include a housing and each include high-speed and low-speed electrical contacts in the housing.

4. The cage assembly of claim 3, wherein high-speed is at least 25 G bits/sec.

5. The cage assembly of claim 3, wherein low-speed is less than 25 G bits/sec.

6. The cage assembly of claim 3, wherein the cables include high-speed cables electrically connected to the high-speed electrical contacts and low-speed cables electrically connected to the low-speed electrical contacts.

7. The cage assembly of claim 2 wherein air flows parallel to the transceiver-mating direction between the first and the second ends and between the upper and the lower receptacle connectors.

8. The cage assembly of claim 7, wherein one of the upper and the lower receptacle connectors mechanically floats in a direction orthogonal or substantially orthogonal to the transceiver-mating direction and does not mechanically float in a direction parallel or substantially parallel to the transceiver-mating direction.

9. The cage assembly of claim 2, wherein the upper receptacle connector mechanically floats within the cage.

10. The cage assembly of claim 2, wherein the upper receptacle connector is a QSFP type of electrical connector that is devoid of press-fit or mounting tails.

11. The cage assembly of claim 2, further comprising a heat sink located between the upper and the lower receptacle connectors.

12. The cage assembly of claim 11, wherein the heat sink is an extrusion or bent sheet metal.

13. The cage assembly of claim 11, wherein the heat sink defines air flow paths.

14. The cage assembly of claim 11, wherein the heat sink defines channels, and the channels in the heat sink are no larger than one quarter of a wavelength of a dominant emitted electromagnetic interference.

15. The cage assembly of claim 11, wherein only a single heat sink is provided adjacent to or between the upper and the lower receptacle connectors.

16. The cage assembly of claim 11, further comprising an upper spring that is configured to bias the mating transceiver inserted into the upper receptacle connector against the heat sink, and a lower spring that is configured to bias the mating transceiver inserted into the lower receptacle connector against the heat sink.

17. The cage assembly of claim 12 wherein the cage defines a slot that extends between the first and the second ends, and the slot is configured to receive a mating transceiver.

18. The cage assembly of claim 2, further comprising a light pipe in the passageway.

19. The cage assembly of claim 2, further comprising a liquid-filled heat pipe attached to the cage.

20. An assembly comprising:
    a substrate;
    a cage assembly of claim 2 mounted to the substrate.

21. The cage assembly of claim 2, wherein air flows in the passageway between the upper and the lower receptacle connectors.

22. The cage assembly of claim 2, wherein the passageway is positioned adjacent to one of the upper and the lower receptacle connectors.

* * * * *